(12) United States Patent
van Soestbergen et al.

(10) Patent No.: US 7,426,489 B2
(45) Date of Patent: Sep. 16, 2008

(54) METHOD AND SYSTEM FOR BANKING AND EXCHANGING EMISSION REDUCTION CREDITS

(75) Inventors: Mark van Soestbergen, Gainesville, FL (US); Kent B. Tambling, Tioga, FL (US)

(73) Assignee: International Carbon Bank and Exchange, Inc., Gainesville, FL (US)

( * ) Notice: Subject to any disclaimer, the term of this patent is extended or adjusted under 35 U.S.C. 154(b) by 1458 days.

(21) Appl. No.: 10/002,562

(22) Filed: Nov. 1, 2001

(65) Prior Publication Data

US 2002/0143693 A1 Oct. 3, 2002

Related U.S. Application Data

(60) Provisional application No. 60/348,924, filed on Oct. 22, 2001, provisional application No. 60/245,327, filed on Nov. 1, 2000.

(51) Int. Cl.
*G06Q 40/00* (2006.01)
(52) U.S. Cl. .................................... 705/37
(58) Field of Classification Search ............... 705/31, 705/37, 52
See application file for complete search history.

(56) References Cited

U.S. PATENT DOCUMENTS

| | | | |
|---|---|---|---|
| 5,481,904 A * | 1/1996 | Fleck et al. ............... 73/61.51 |
| 5,630,127 A * | 5/1997 | Moore et al. ............ 707/103 R |
| 5,787,402 A | 7/1998 | Potter et al. |
| 5,831,876 A * | 11/1998 | Orr et al. .................... 703/6 |
| 5,887,547 A | 3/1999 | Caveny et al. |
| 5,915,209 A | 6/1999 | Lawrence |
| 5,924,083 A | 7/1999 | Silverman et al. |
| 5,950,177 A | 9/1999 | Lupien et al. |
| 5,963,923 A | 10/1999 | Garber |
| 5,975,020 A | 11/1999 | Caveny et al. |
| 5,995,947 A | 11/1999 | Fraser et al. |
| 6,005,939 A | 12/1999 | Fortenberry et al. |
| 6,601,033 B1 * | 7/2003 | Sowinski .................... 705/1 |
| 6,907,402 B1 * | 6/2005 | Khaitan .................... 705/26 |

OTHER PUBLICATIONS

Chen Hsiang Yeang et al., Distributed GIS for Monitoring and Modeling Urban Air Quality, 6th International Confernece in Urban Planning and Urban Management, Sep. 1999 http://dspace.mit.edu/bitstream/1721.1/33459/1/mit_distributed_GIS_cupum99.pdf.*
State of California Public Hearing to Consider Statewide Regulation, Air Resource Board, Apr. 4, 1997 http://www.arb.ca.gov/regact/ierc/isor.pdf7.*

(Continued)

*Primary Examiner*—Abdul Basit
*Assistant Examiner*—Jamie Swartz
(74) *Attorney, Agent, or Firm*—Christine Q. McLeod; Beusse Wolter Sanks Mora & Maire

(57) ABSTRACT

The present invention provides a system and method of for the banking and trading of emissions reductions credits (ERC's) and a computer site therefore. The system and method of the present invention utilizes a global communication network to trade ERC's.

42 Claims, 41 Drawing Sheets

OTHER PUBLICATIONS

State of California, Mobile Source Emission REduction credits, Sep. 1995, http://arb.ca.gov/msprog/mserc/hdcrguid.pdf.*

Release of MVE17G, Air Resources Board PUblication, Oct. 3, 1996 http://arb.ca.gov/msei/onroad/mvei7g/letter.pdf.*

IPCC Guidelines for National Greenhouse Gas Inventories: Workbook,—Introduction and Module 1-Energy, 1996, www.ipcc.ch.*

State of California Air Resource Board, Final Statement of Reasons for Rulemaking including Summary of Comments and Agency Response, Agenda Item 97-4-2 May 22, 1997 http://www.arb.ca.gov/regact/ierc/fsor.pdf.*

Chen Hsiang Yeang et al., Distributed GIS for Monitoring and Modeling Urban Air Quality, 6th International Conference in Urban Planning and Urban Management, Sep. 1999 http://dspace.mit.edu/bitstream/1721.1/33459/1/mit_distributed_GIS_cupum99.pdf.*

* cited by examiner

METHOD AND SYSTEM FOR BANKING AND EXCHANGING EMISSION REDUCTION CREDITS

CROSS-REFERENCE TO RELATED APPLICATIONS

This application claims the benefit of U.S. Provisional Application No. 60/245,327, filed Nov. 1, 2000, and U.S. Provisional Application No. 60/348,924 filed Oct. 22, 2001 under incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to a method and system for the banking and trading of emission reduction credits (ERC's). Specifically, the invention relates to a method and system for a global online venue for the issuing of ERC's to renewable energy systems, for their reduction or their need for fossil fuels, and the transferring of ERC's to systems in need of ERC's.

BACKGROUND OF THE INVENTION

Many changes in how exhaust gases are treated are due to the policies proposed at UNFCCC conferences held at Rio de Janeiro, Kyoto, Buenos Aires, to name a few. This convention meets to address the growing suspicion that some gases are possibly trapping heat in the earth's atmosphere, and therefore, altering normal climate behavior.

As a result, emissions trading was introduced as a method to control the global production of greenhouse gases. As proposed, emissions trading does not mean an exemption from emissions reduction, but rather the trade of ERC's from one location to another. For example, a country with a substantial amount of annual winds may construct wind turbines to generate electricity, thereby receiving ERC's for the reduction in emissions. A country with excessive emissions may purchase ERC's from another country to offset their excessive emissions.

In order to be effective, the emissions of the participating countries, states, counties, cities, individual business, etc., must be compiled and updated on a regular basis. Additionally, the receipt of ERC's and the trading of ERC's must be documented, giving credit for low emissions and for the trading of ERC's. A global communication system for effecting this system is needed.

One of the more significant developments in the computing industry in the last few years has been the emergence of the World Wide Web (WWW) as a global communication system. With the Web, a computer operator, equipped with an appropriately connected computer and a software package called a browser, can explore vast amounts of information stored on computers around the world. Navigating (surfing) the Web is relatively simple, typically requiring only clicking a computer mouse to move between Web documents, even when the documents are located at separate locations.

HTML (HyperText Markup Language) is a language used to provide information on the Web. HTML provides a rich lexicon and syntax for designing and creating useful hypertext and hypermedia documents. With HTML, Web designers can describe the format and content of a Web document, which may include, for example, text files, graphics files, and multimedia files. When accessed by a client computer (i.e., the computer local to the browser), the HTML file is transmitted to the client computer over a network such as the Internet and interpreted by its browser.

Therefore, there is a need in the art for a method by which a global communication system can be utilized to conduct emissions trading.

There is also a need in the art for a method of computing emissions.

BRIEF SUMMARY OF THE INVENTION

The present invention solves the above-stated problems in the art by providing a system and method for the trading of emission reduction credits (ERC) via the World Wide Web (Internet) or other suitable communications means.

As a method the subject invention directly links persons who buy an emission reduction with the system that created the reduction. The reduction is tagged and can be tracked though various changes in ownership. The tagging provides a level of accountability to a commodity which otherwise is abstract. The subject invention provides a global, online venue for the issuing of emission reduction credits (ERC's) to renewable energy systems for their reduction of the need for fossil fuel use. The information obtained about these systems will also be of value in the assessing of the impact of renewable energy systems in reducing greenhouse gases (GHG's) for national inventories, mandated by the Kyoto Protocol and Annex I agreements. The subject invention also provides persons or companies wishing to voluntarily offset the emissions produced by their lifestyle or product an opportunity to purchase emission reduction credits. Revenue from purchased ERC's is forwarded to the RE system owner, rewarding him for ERC creation, and a portion is allocated to a fund for financing the installation of more renewable energy systems, thus securing future decrease in GHG production. The Exchange Module of the subject invention is an online carbon credit trading function for carbon credit speculation. The Bank of the subject invention has been created to track the accounts of persons or companies participating in the creation, crediting, or sales of ERC's. Additional benefit is gained by the creation of a database of RE system manufactures and installers which can be used to track product use online, while also offering an inexpensive way for manufacturers and installers to advertise themselves to prospective buyers.

Features of the invention can be implemented in numerous ways, including as a system, a method, a computer site, or a computer readable medium. The invention preferably relies on a communications infrastructure, for example the Internet, wherein individual interaction is possible. Several embodiments of the invention are discussed below.

In one embodiment of the method, the invention provides a method for registration of carbon sinks including renewable energy and emission reduction systems, wherein a carbon sink represents an asset in an account, the method includes: (a) receiving information to identify a customer account; (b) receiving input to identify type of carbon sink; (c) receiving input data used to calculate emission reduction provided by the carbon sink; (d) calculating an emission reduction credit (ERC) value representative of the renewable energy and emission reduction provided by the carbon sink; and (e) crediting a percentage of the ERC value to the customer account.

In another embodiment of the method, the invention provides a method for registration of a carbon source, wherein a carbon source represents a liability in an account, including: (a) receiving information to identify customer account; (b) receiving input to identify type of carbon source; (c) receiving input data used to calculate energy consumption and emissions output of the carbon source; (d) calculating greenhouse gas (GHG) emissions value produced by the carbon source; and (e) debiting the GHG value from the customer account.

In another embodiment, the invention provides a method for tracking emission reduction credits between sellers and purchasers, wherein the emission reduction credits assigned to a carbon sink represent an asset in an account, including: (a) registering for a seller a carbon sink comprising renewable energy and emission reduction systems wherein an emission reduction credit (ERC) value representative of the renewable energy and emission reduction provided by the carbon sink is assigned to the carbon sink; (b) assigning a unique identification to the emission reduction credit (ERC) value of the seller; (c) making the ERC value for the carbon sink available for purchase; (d) receiving a purchase request from a purchaser for the ERC value; (e) matching the unique identification to an identification of the purchaser; and (f) crediting the ERC value to an account of the purchaser as an asset.

In still a further embodiment, the invention provides a method for mapping GHG emissions information using various parameters to aid in the management of the transfer of GHG reductions to offset emissions by creating a volumetric global positioning system timestamp (VGT) including: (a) recording GHG activity including data indicative of location, address, GPS, elevation, GHG parameters and time frame of event; (b) creating a Volumetric GPS Timestamp (VGT) as a virtual box representing the emission or reduction volume of a GHG; (c) associating the VGT box with a discreetly defined space on planet earth, using the GPS and elevation coordinates anchoring the bottom center of the VGT box, wherein the VGT box serves as a marker, aiding discovery of emission and reduction information introduced that has the same time frame, location, or volume; and (d) projecting and transposing 'empty' boxes on top of full boxes to manage the transfer of GHG reductions to offset emissions.

As a computer system, part of the invention generally includes a database and a processor unit. The processor unit operates to receive information regarding emission output or emissions reduction methods utilized, analyzing the received information to generate emissions reports stating the amount of ERC's needed or the ERC's available for trade. The output may include print or electronic media.

Part or all of the data can also be sent electronically and maintained on a web server for confidential access with typical browsers. The data may also be transmitted and viewed by other well-known techniques such as email, interactive television, and the like. The computer site is preferably viewed with a client web browser as an HTML document through a web secure server communicating with an application server having a database associated therewith.

As a computer readable medium containing program instructions for collecting, analyzing and generating output, an embodiment of the invention includes computer readable code devices for interacting with a consumer as noted above, processing that data, and generating printed or electronic media for that consumer.

The advantages of the invention are numerous. First and foremost, the invention provides for a method by which consumers can determine their emissions output. A resulting advantage is the ability to purchase only the required ERC's needed or trade any excess ERC's.

Additionally, the subject invention provides a way to make RE systems more economically feasible by crediting them with ERC's, increasing their value and enhancing RE competitiveness as an energy resource.

The subject invention also provides a method to provide affordable financing for RE systems, increasing the total number of RE systems in operation.

Furthermore, the subject invention quantifies emission reduction achieved by renewable energy systems on instantaneously, crediting the system owner's account with the realized ERC's, tagging the ERC's and making those reductions available for purchase in one integrate system.

Other aspects and advantages of the invention will become apparent from the following detailed description taken in conjunction with the accompanying drawings, illustrating by way of example the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification. The following patents are incorporated by reference: U.S. Pat. Nos. 5,787,402 (Potter et al.), 5,887,547 (Caveny et al.), 5,915,209 (Lawrence), 5,924,083 (Silverman et al.), 5,963,923 (Garber), 5,995,947 (Fraser et al.), and 6,005,939 (Fortenberry et al.)

BRIEF DESCRIPTION OF THE DRAWINGS

The present invention together with the above and other objects and advantages may best be understood from the following detailed description of the preferred embodiments of the invention illustrated in the drawings, wherein.

Figure 1:
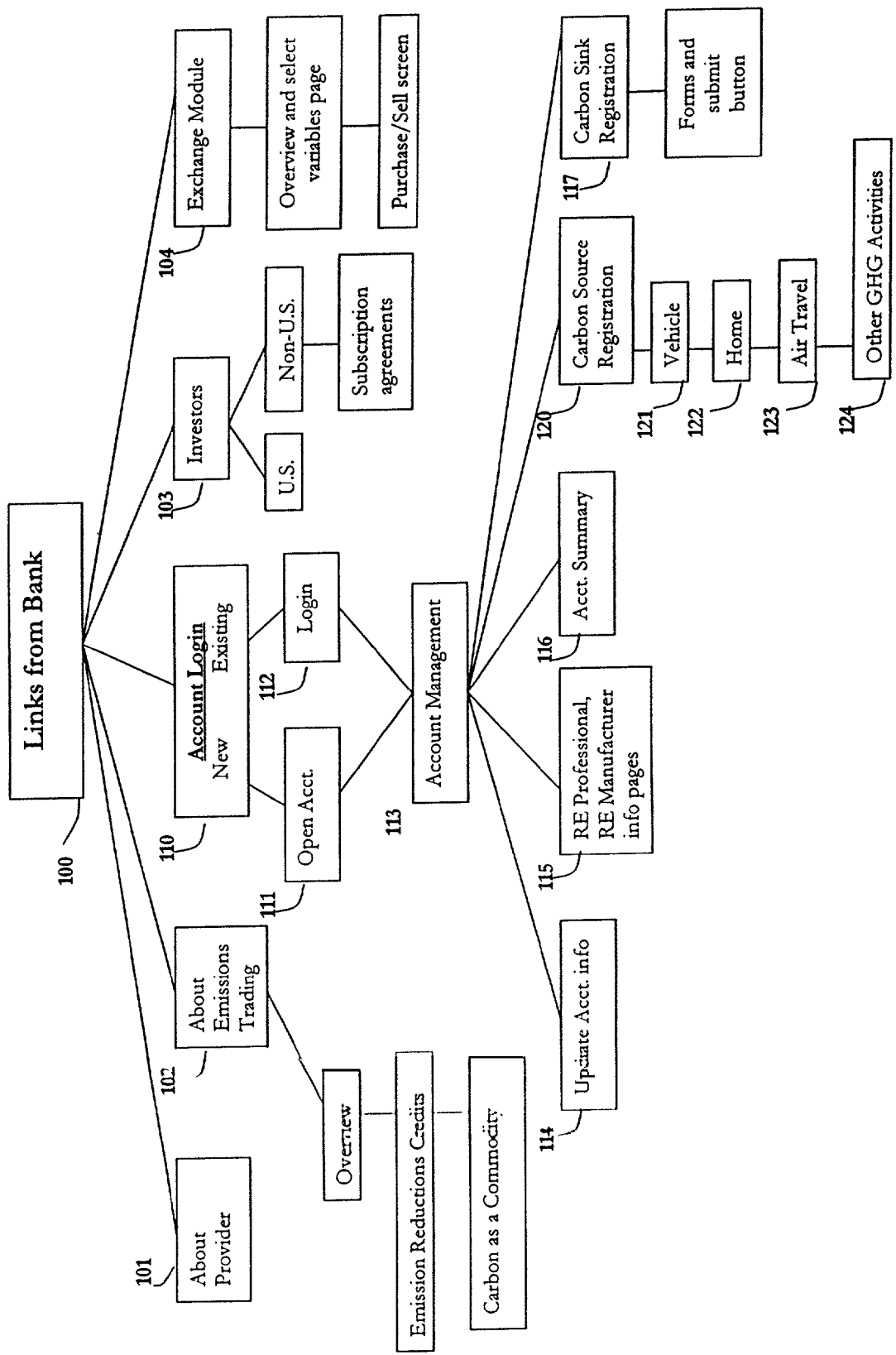
FIGS. 1-3 show a map of the preferred site links the present invention.

It should be understood that in certain situations for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

DETAILED DISCLOSURE OF THE INVENTION

Reference will now be made in detail to the embodiments consistent with the invention, examples of which are illustrated in the accompanying drawings. Wherever possible, the same reference numerals used throughout the drawings refer to the same or like parts.

The present invention generally comprises a web interface application (front-end) for graphical user interface (GUI), back-end applications to support the operation of the bank & exchange, database server software, and the database associated therewith.

In a preferred embodiment, the present invention operates similar to standard e-commerce sites with the exception of having the additional unique features of the invention. Preferably, the invention is operated as an interactive website with a home page and multiple sub-pages linked thereto to provide the different features of the invention. The typical operation of the website from a user's point of view will now be explained in detail. In the following description, a preferred embodiment of the invention is described with regard to preferred process steps wherein "Provider" is used to refer to the entity or means for providing the method of the present invention.

As shown in FIG. 1 (Links on Home Page), all processes and information can be accessed from here. All registration and transaction pages require setting up an account in Account Management 110, which is reached via a link 113 from the home page of the site. This process creates a handle, as described in FIG. 15. In Account Management 110 a client may update their address and/or contact information 114, search for a renewable energy, "RE", manufacturer or installer 115, view a summary of their account activity 116, register a forest as a carbon sink 117, or register their vehicle 121, home energy use 122, air travel 123, or other activity involving Greenhouse Gas, "GHG", emissions from fossil fuel combustion 124.

Figure 2:
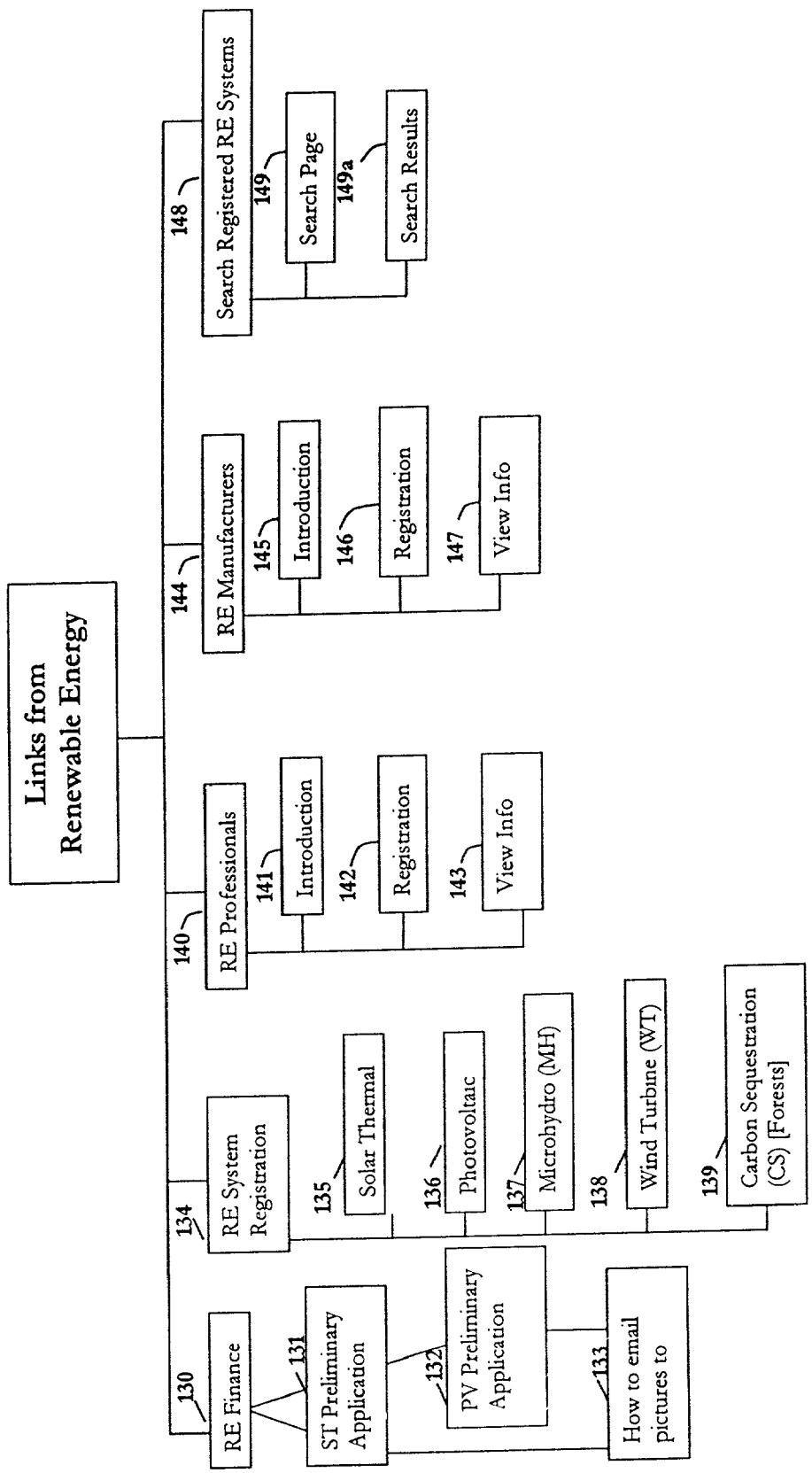
Figure 3:
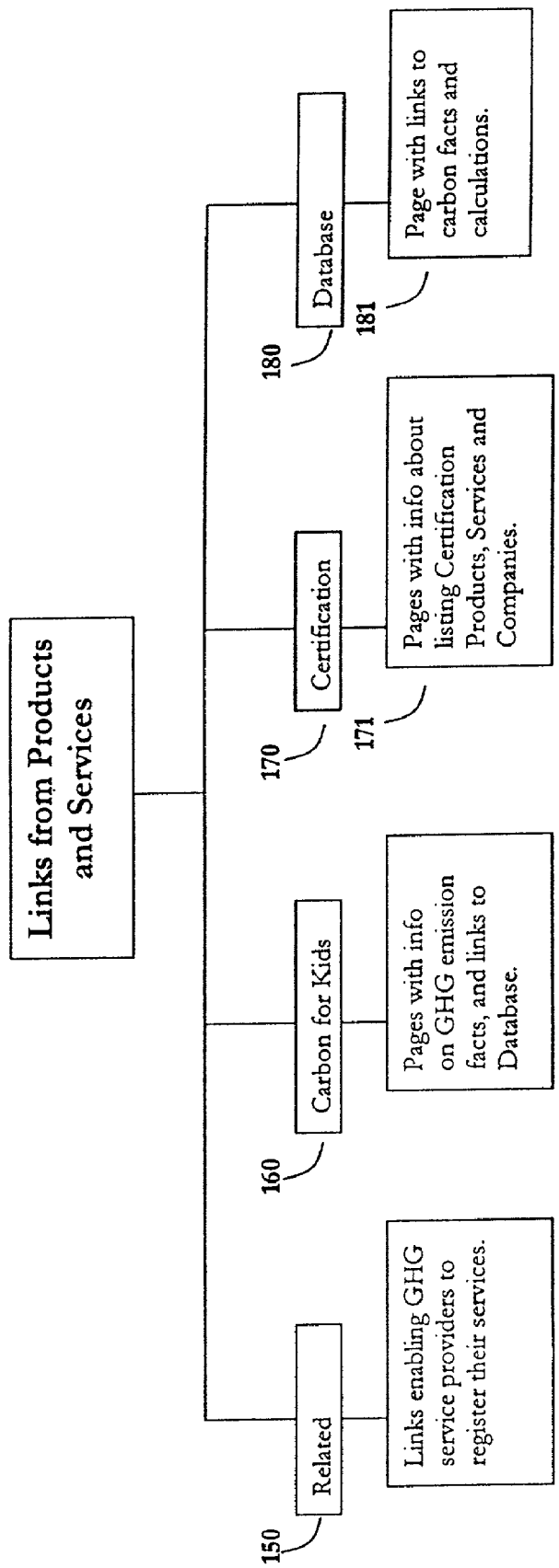
Figure 4:
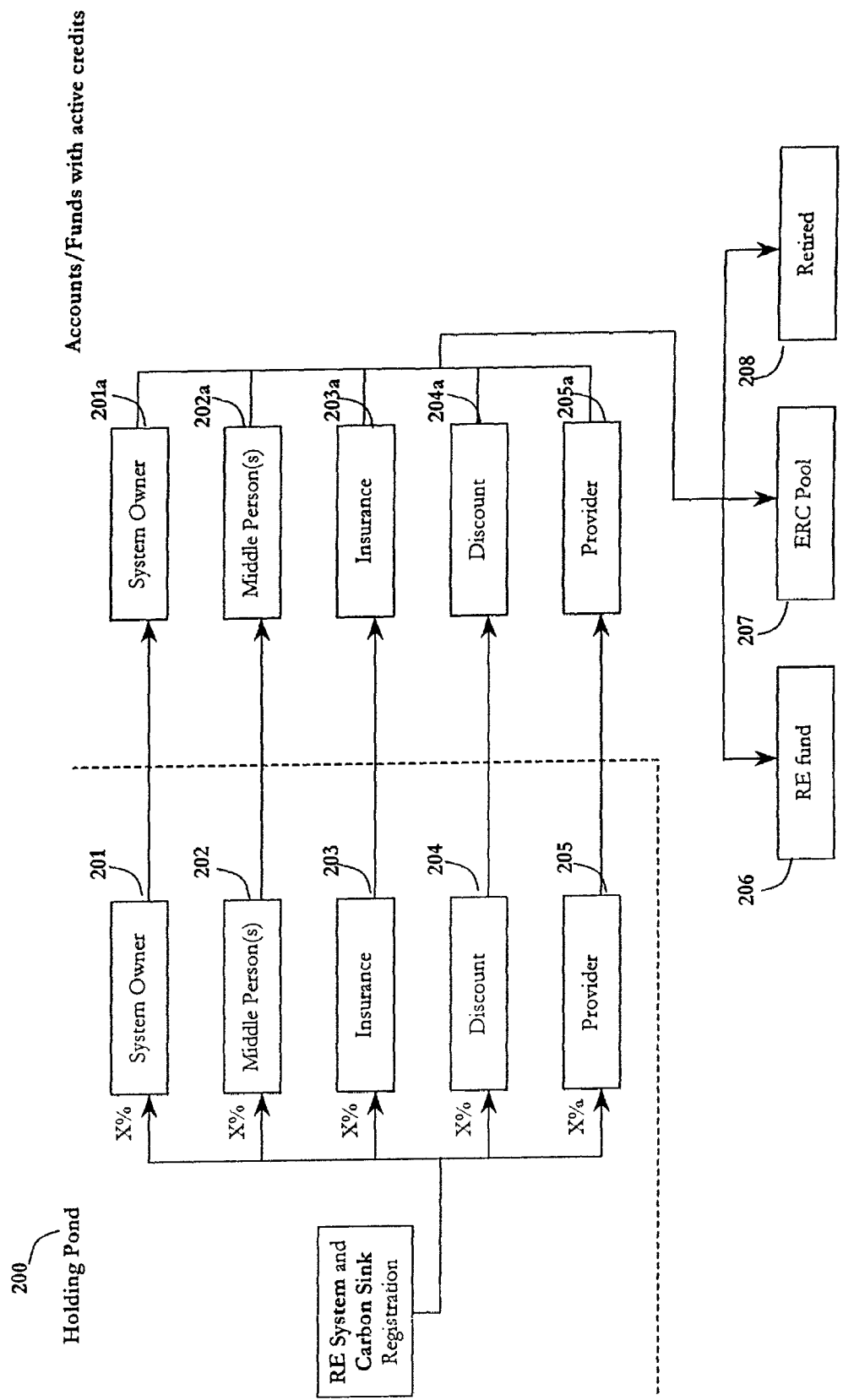
FIGS. 4-11a describe the flow of emission reduction credits (ERC's) into and within the Bank.

Further links from the home page are represented in FIG. 2 and FIG. 3. FIG. 2 diagrams the links to pages used for:
1. Application for RE system financing 130
2. RE system registration and application for "emission reduction credit/ERC" accreditation 134
3. Registration into the RE professional database 140.
4. Registration into the RE manufacturer database 144.
5. Searching the database of RE systems currently registered 148.

FIG. 3 diagrams the links from the home page to Related Services 150 for legal and consultation services, Carbon for Kids 160 for the education of the young regarding global warming issues and information, Certification 170 for registering carbon sources, and the Database 180 for information regarding the calculation of ERC'S, global warming, conversion factors, and interesting facts about $CO_2$ and other GHG's.

FIGS. 4-11 show the flow of ERC's into and within the Bank. The action of registering an RE system or forest as a carbon sink 209 creates ERC's by giving the information necessary to evaluate how much GHG's are being reduced by the operation of the RE system or the management of the forest. These are calculated and divided into five accounts/funds by a percentage 203-205. The level of accreditation that the system owner has chosen dictates this percentage. The ERC's are in a holding pond 200 until an RE professional has verified the system, and Provider staff has reviewed all documentation. After clearance is given, ERC's flow into the following accounts/funds:

System Owner 201: This will be the owner of the RE system or carbon sink.

Middle Person(s) 202: This will ordinarily be the account of the person who installs and/or verifies the RE system and other emission reduction systems being credited.

Insurance 203: This fund is for insurance against natural catastrophe, fraud, and the like. This fund is primarily deposit.

Discount 204: This fund accommodates the uncertainty factor currently a part of most reduction calculations. This fund is primarily deposit.

Provider 205: Provider account. This fund manages Provider's ERCs.

RE fund 206: This fund receives ERC's from various sources (see FIG. 9). These ERC's are then sold to finance the installation of more RE systems.

ERC Pool 207: This is where credits that are available for sale are stored. This fund is for purchasing offsets.

Retired 208: This fund is where account holder's can permanently retire credits. ERC's can enter this fund, but cannot be withdrawn. There is also a "retired" status of credits that have been purchased as offsetting a particular GHG emission source. This fund is deposit only.

Figure 5:
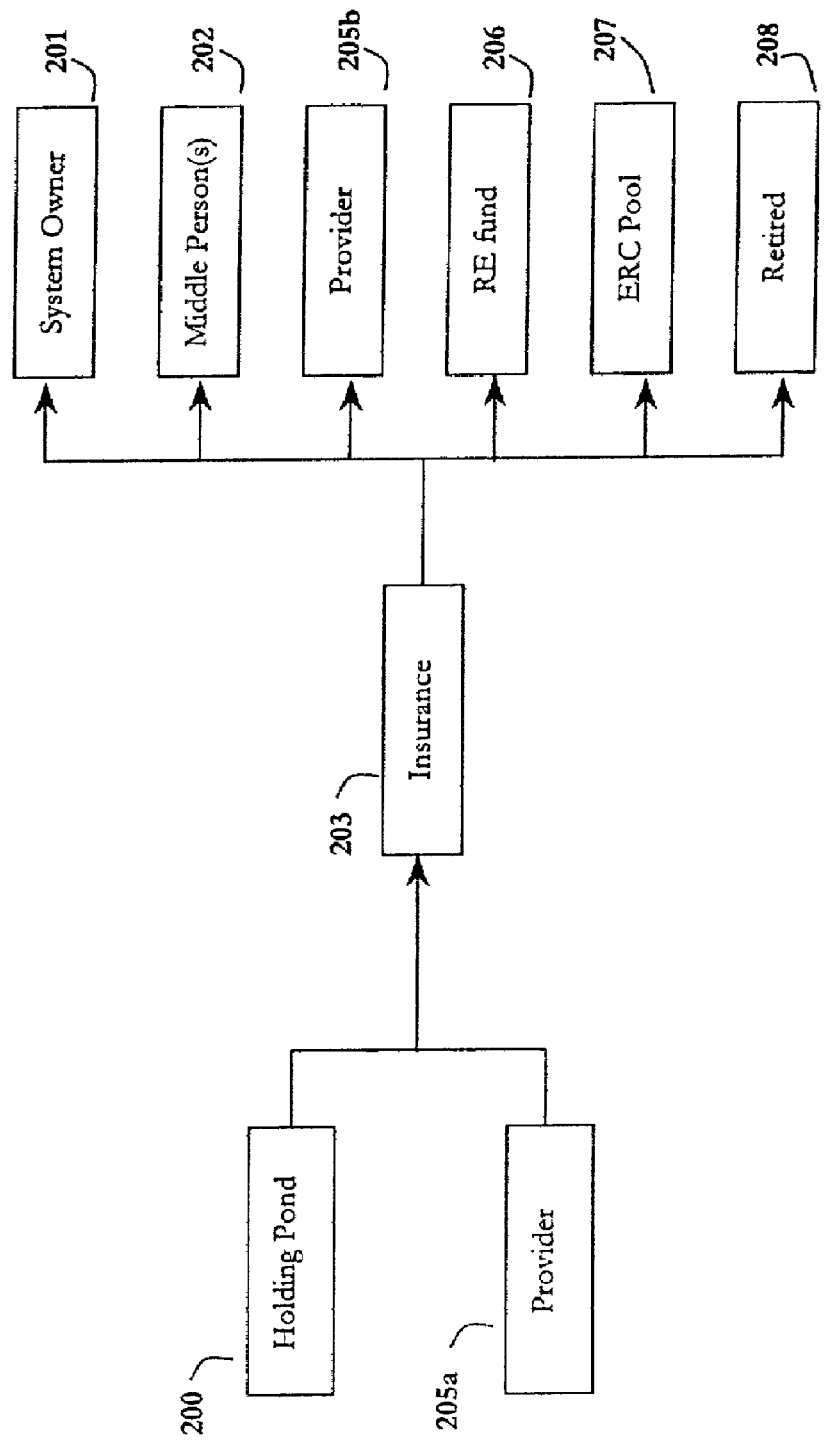
Figure 6:
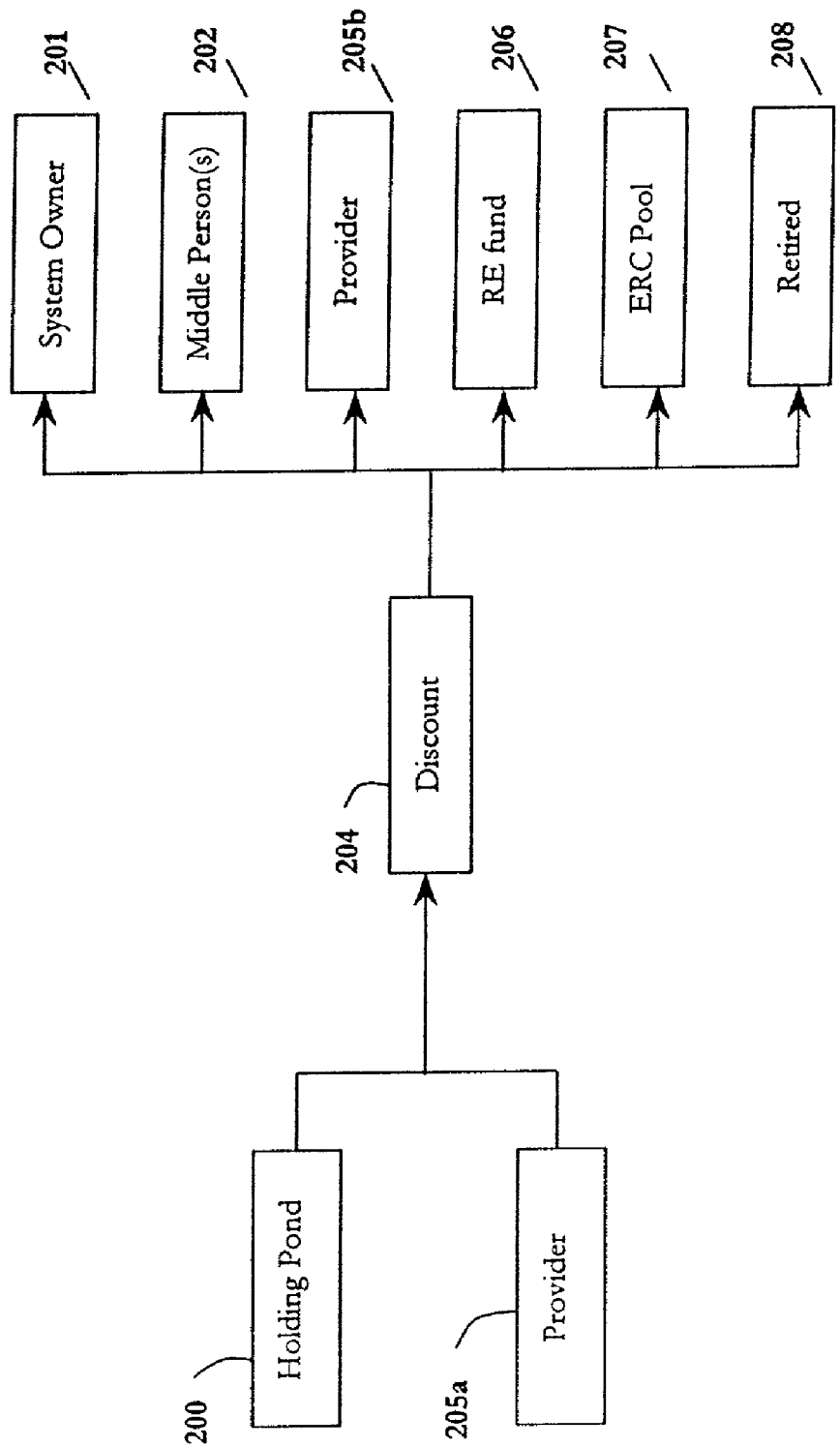

FIGS. 5-11 describe the flow of ERC's between accounts/funds. FIG. 5 shows the flow of ERC's for the Insurance fund 203. ERC's flow in from the holding pond described in FIG. 4 or are transferred by Provider. It is possible that in the future we may be able to reduce the percentage of ERC's needed for insurance. In this case, it is necessary to have a way to rebate the accounts/funds for the "overcharging" created by the higher insurance percentage. Shown are the accounts/funds that could receive such a rebate 201,202,205-208. FIG. 6 shows the same flow for the Discount fund. It is possible that in the future we may be able to reduce the percentage of ERC's needed to discount from the system potential. As accuracy of measurements, constants, and methods increases, the amount of discount percentage may decrease. In this case the rebate scenario mentioned above will apply.

Figure 7:
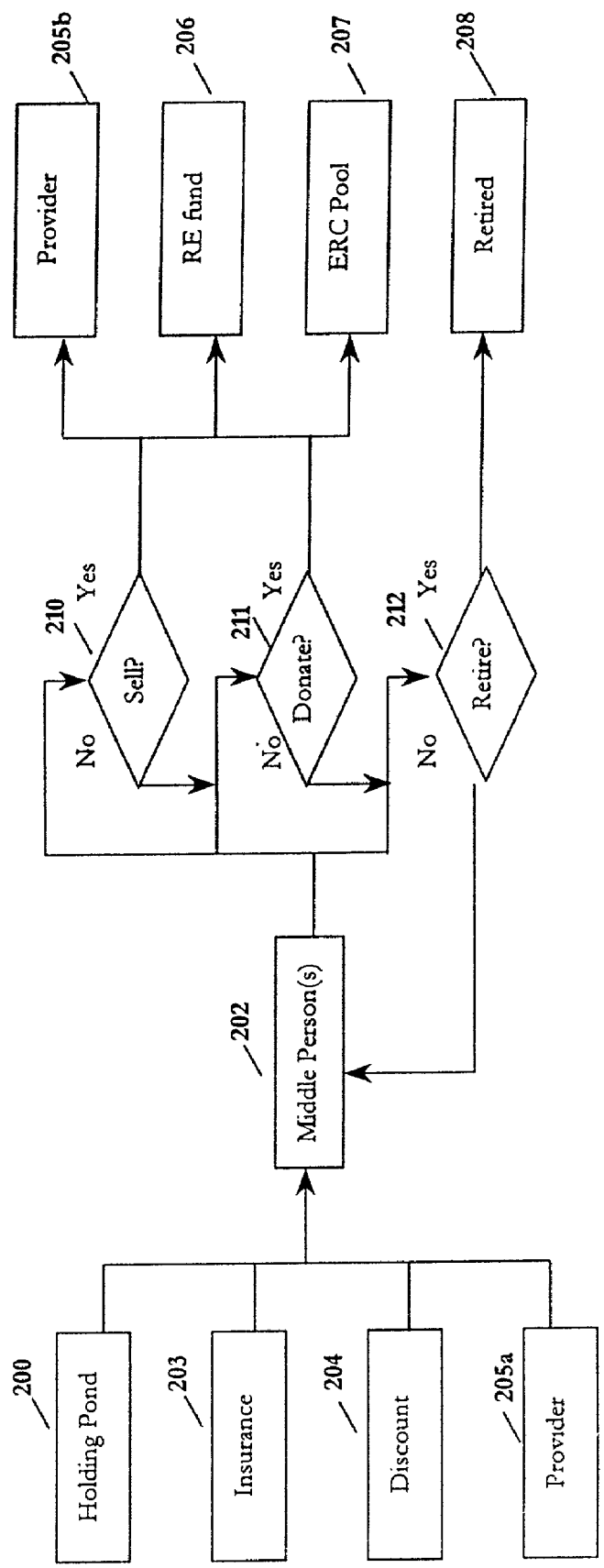
Figure 8:
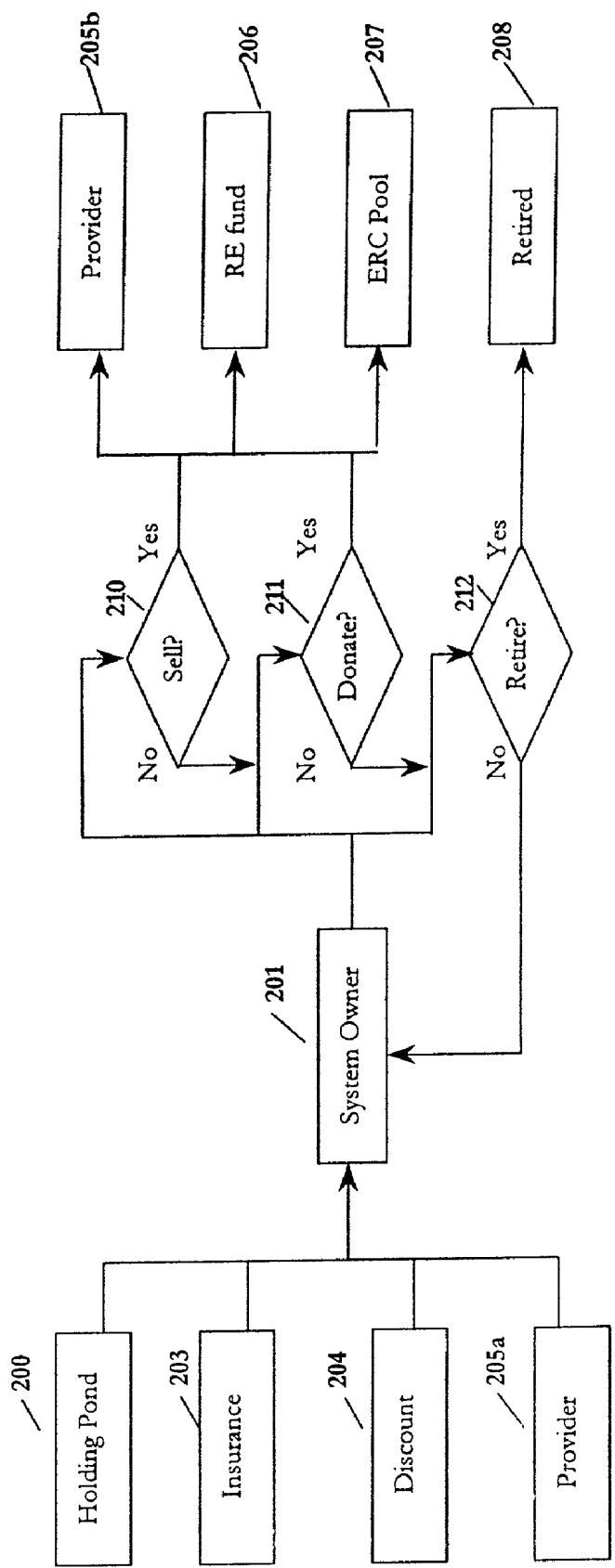

FIG. 7 and FIG. 8 show the flow of ERC's into and out of the middle person's account 202 and the system owner's account 201. There are several different possibilities for who the middle person might be. This can be the manufacturer of the system, a professional who installs systems, or an accredited person hired by Provider. They are responsible for verification of the system described in the registration and application for credit received by Provider. Their options are described in 210-212. They may sell 210 the ERC's in their account 202 to Provider 205, or they can put them up for sale in the ERC Pool 207. They also have the option to donate 211 their ERC's to the ERC Pool 207, Provider 205, or the RE fund 206. The other option available is to retire 208 them. By retiring their ERC'S, account holders take them out of circulation forever.

FIG. 8 shows the same options are available to the system owner 201 as are available to the middle person 202. Of note is the fact that the system owner 201 and the middle person 202 cannot sell or donate his/her credits to the other. This is done to prevent the possibility of collusion or fraud.

Figure 9:
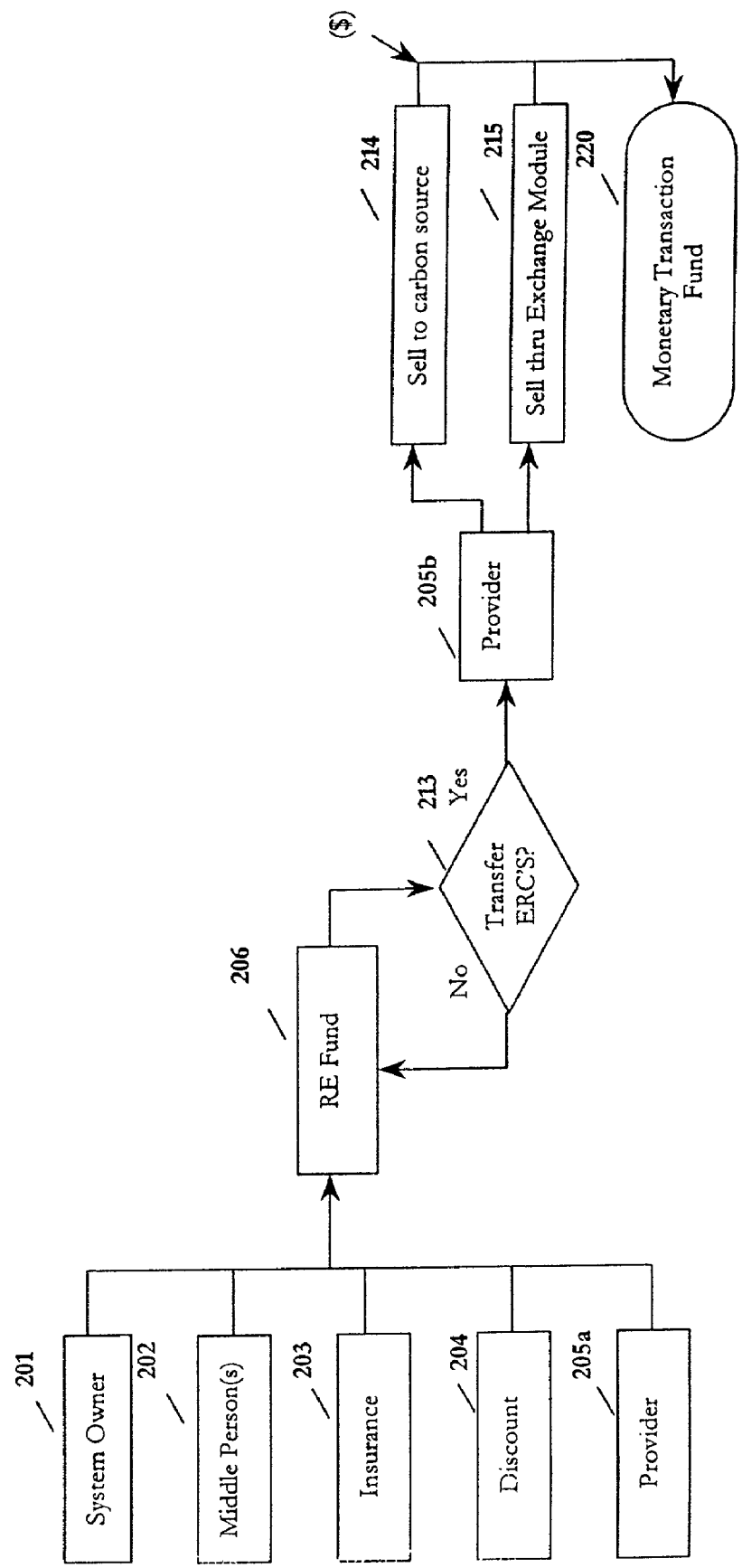

FIG. 9 shows the flow of ERC's into and out of the RE fund 206. Provider 205 can transfer ERC's out of the RE fund 206 and sell them either to a carbon source 214 wishing to purchase an offset, or list them for sale on the Exchange Module 215. This monetary amount is then deposited in the Provider Monetary Fund 220 for use in financing the purchase and installation of RE systems.

Figure 10:
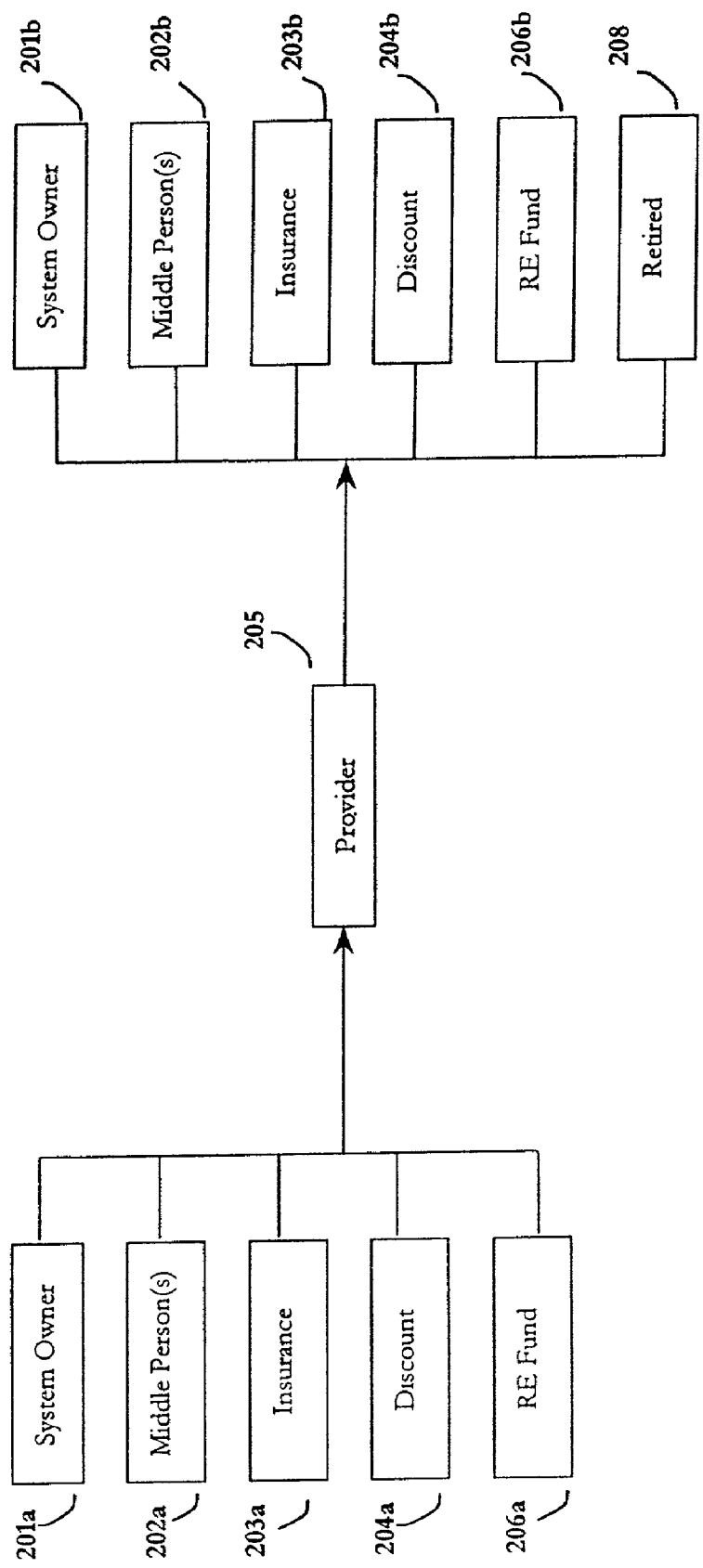

FIG. 10 shows the fact that Provider has administrative control over all accounts. In the case of any error, Provider has the ability to rectify accounts manually.

Figure 11:
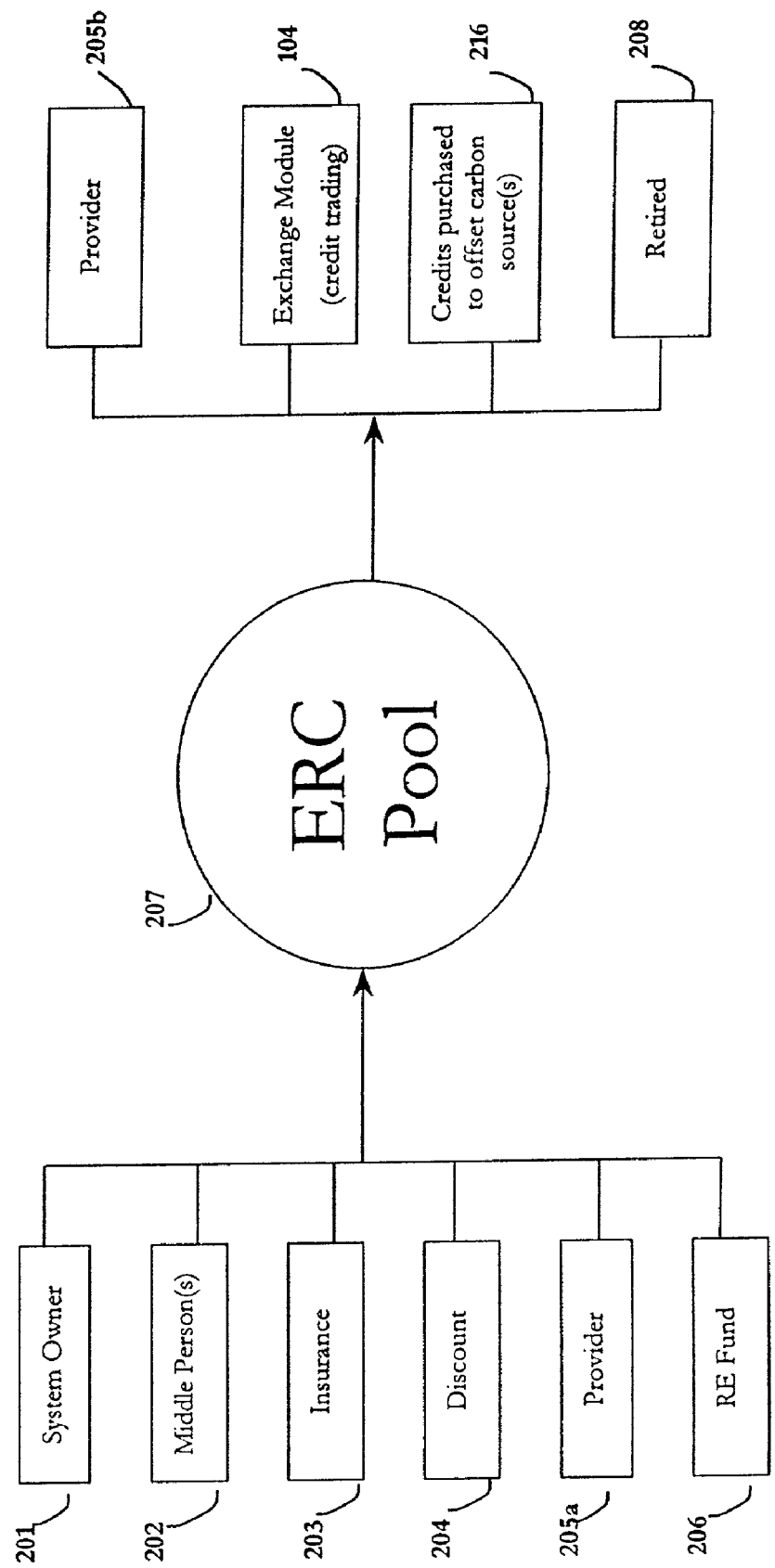
Figure 11B:
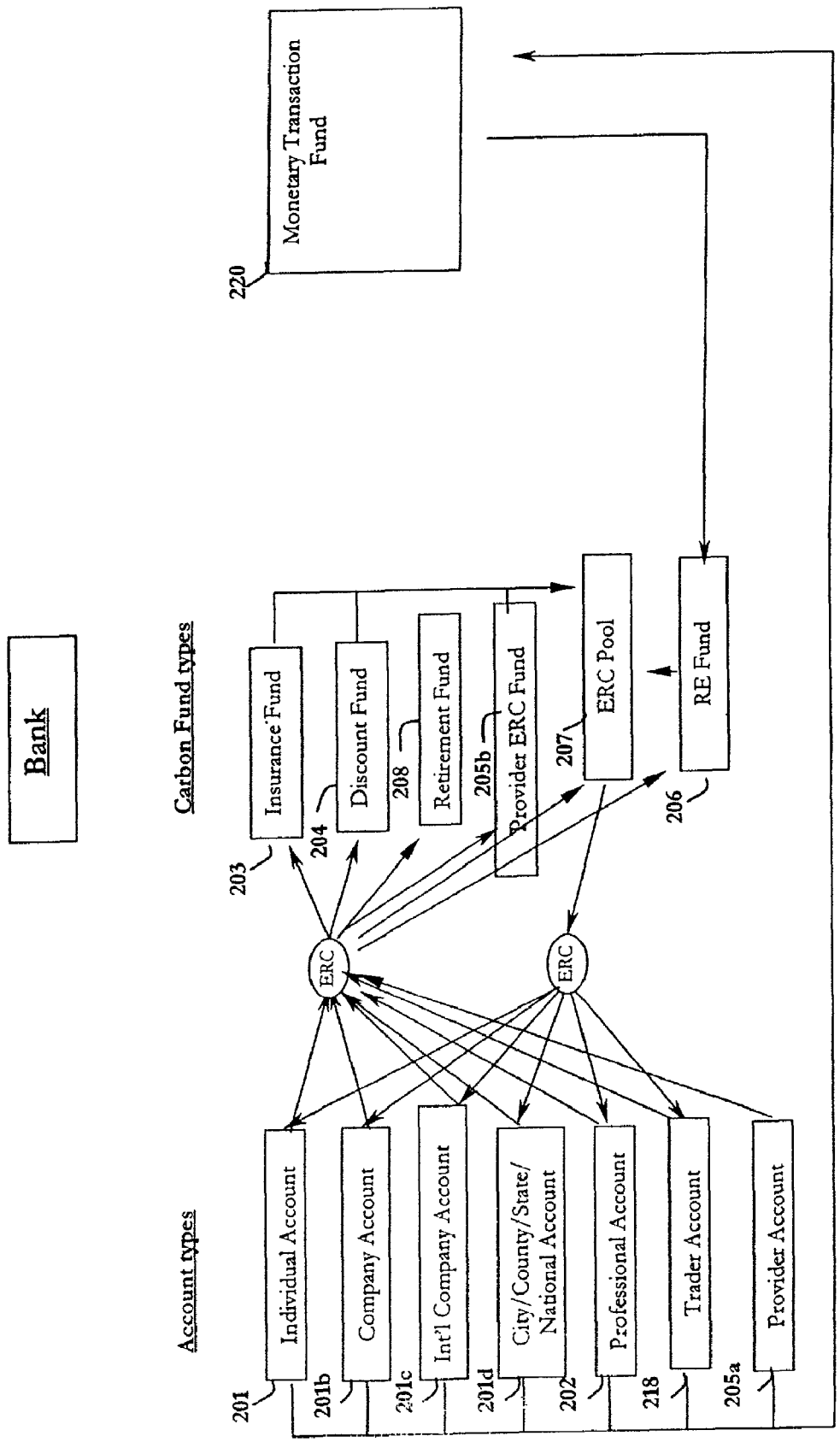

FIG. 11 illustrates the fact that the ERC Pool 207 is where credits go to be purchased by a carbon source as an offset or traded on Exchange Module. Each gram associated with an ERC is tagged with an identification ID that can trace it back to the original RE system or sink that created it (see FIG. 13). Buyers can steer their purchases toward a particular RE type such as Solar Thermal, Photovoltaic, or Microhydro, etc.

FIG. 11a shows the various types of accounts that generate emissions information 201, 202,205,218 and ERC funds which house legitimized emissions reduction information 203-208. The Monetary Transaction Fund 220 records cash activities associated with various Bank services and ERC movements.

Figure 12:
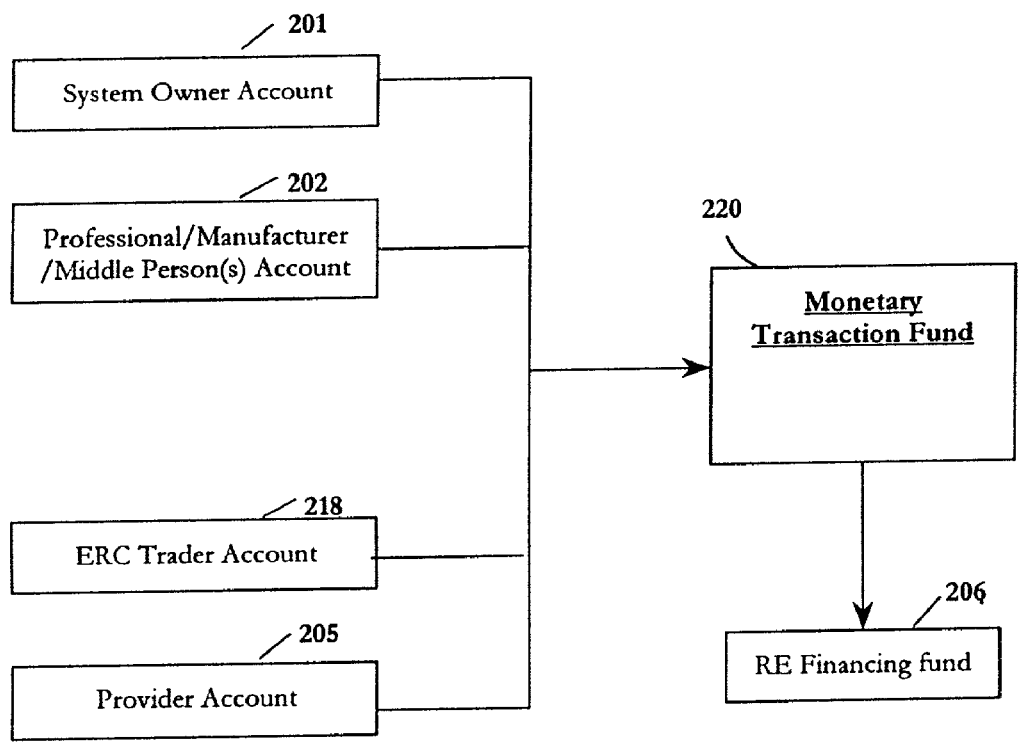
FIG. 12 describes the flow of money within the Bank.

FIG. 12, the Monetary Transaction Fund 220, describes how dollars flow into and within the bank. Each account holder, except Provider 205, pays account management fees. Registration fees are paid by system owners 201. Trading fees are paid by traders 218 using Exchange Module 104. RE professionals and manufacturers 202 pay advertisement fees for uploading ads and pictures. Provider 205 can take the ERC's from the RE fund 206 and sell them to a carbon source or on Exchange Module 104 to finance the installation of more RE systems.

Figure 13:
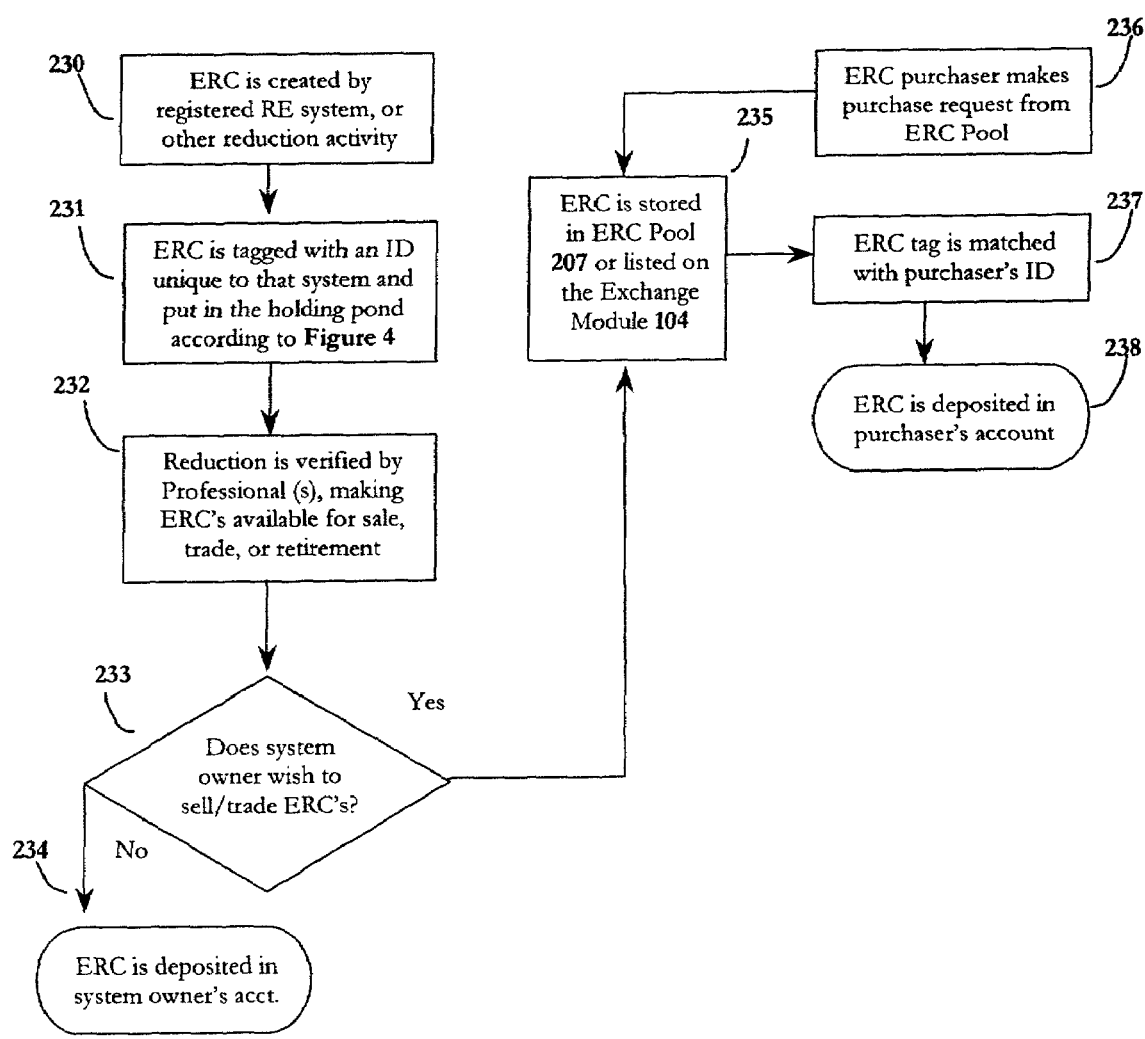
FIG. 13 describes the mechanism for associating the type of system that created the ERC's to the purchaser of the ERC's.

FIG. 13 illustrates the Carbon Tracingconcept. Once ERC's are created, they are given an ID tag 231 that will follow it throughout its life in this system and put in separate accounts/funds according to FIG. 4. After the reduction has been verified by a professional and has cleared the Holding Pond 200, the ERC's can be sold to Provider or listed for sale on Exchange Module 235. At that point, the original ID tag and the purchaser's ID are joined in the same record 237 making it possible to track all ERC's from the system or sink that created it to the end-user.

Figure 14:
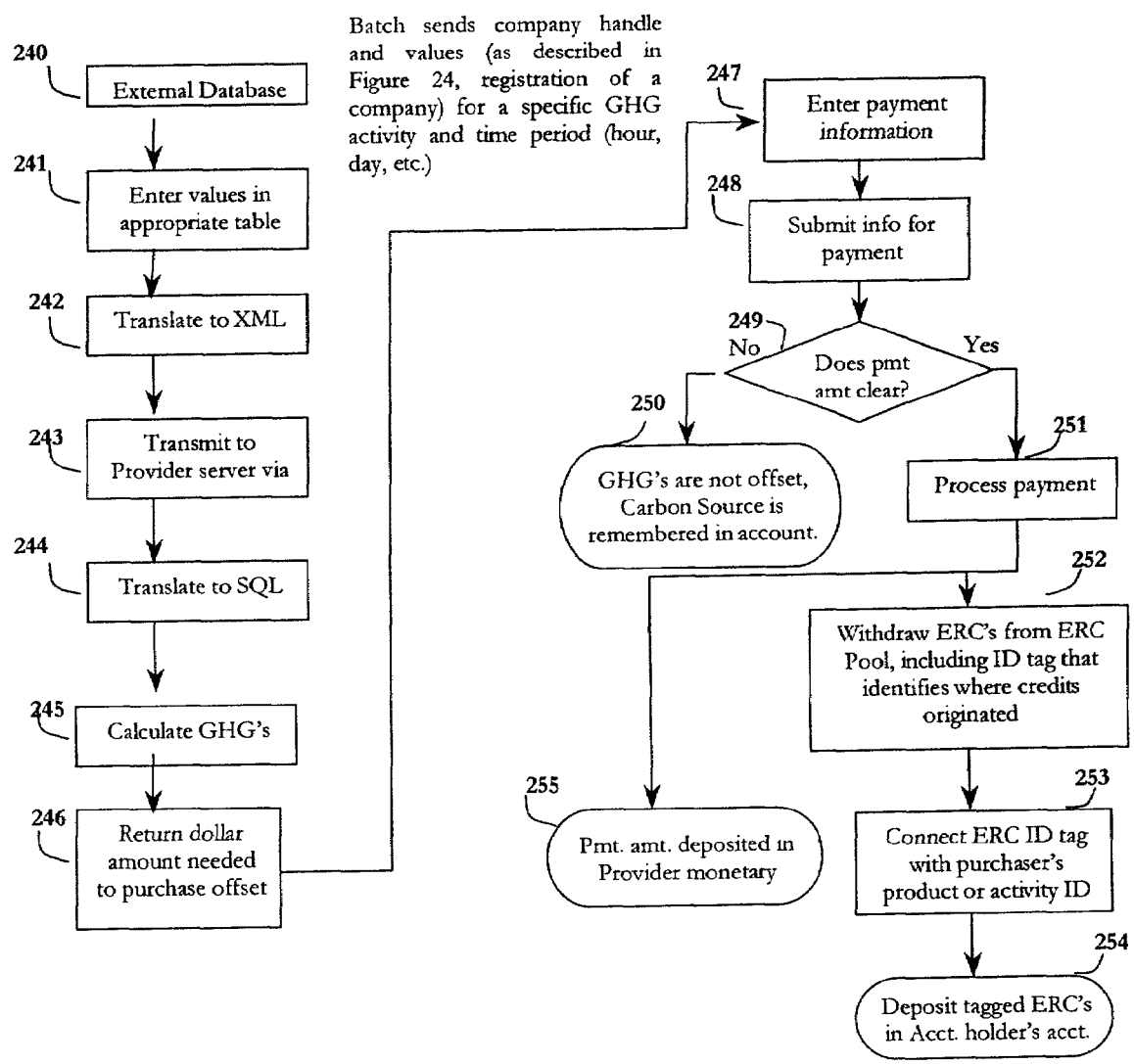
FIG. 14 describes a method for using an external database to report greenhouse gas (GHG) emission quantities and purchasing the offsetting amount of ERC's.

FIG. 14 describes how to use an external database to register, calculate GHG emissions and purchase ERC's to offset the emissions. This is used to connect an external database 240 (company, government) and automatically enter the required information 241 using the natural language of the database. This information is then translated to XML 242 using industry standard software and transmitted to Provider server 28 via the Internet 243. Here, the information is translated to SQL 244 and used to calculate the GHG emissions 245. The dollar amount needed to purchase the ERC's needed to offset is returned to the external database 246. Upon deciding to purchase, payment amount and information (Bank ID, acct. no., etc.) 247 is submitted 248 and processed 251. ID tagged ERC's are then withdrawn from the ERC Pool 252, connected with the purchaser's ID 253, and deposited in the account holder's account 254. The dollar portion of the transaction is deposited in the Provider monetary find 255. Emission not offset on the fly are simply stored in account for informational purposes and can be dealt with later 250.

Figure 15:
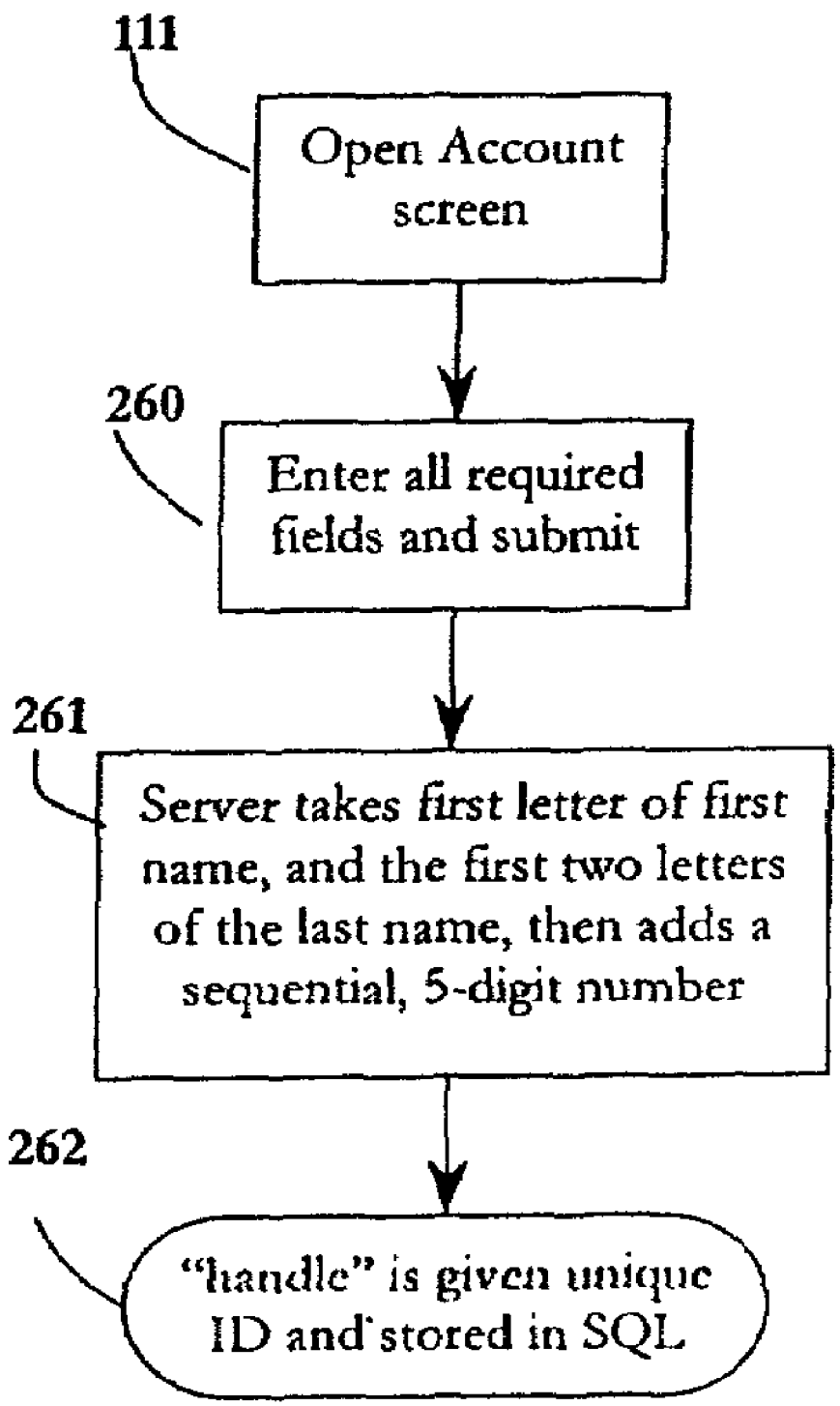
FIG. 15 describes the method for assigning a handle to the account holder

FIG. 15 briefly describes the process of creating a handle in the system. Through Account Management 111, one fills out the form and submits it to Provider 260. Then the server 28 takes the first letter of the first name, and the second letter of the last name and adds a sequential number 261. This greatly adds to the speed and accuracy with which queries can be run. The handle is then stored in the appropriate SQL table 262.

Figure 16:
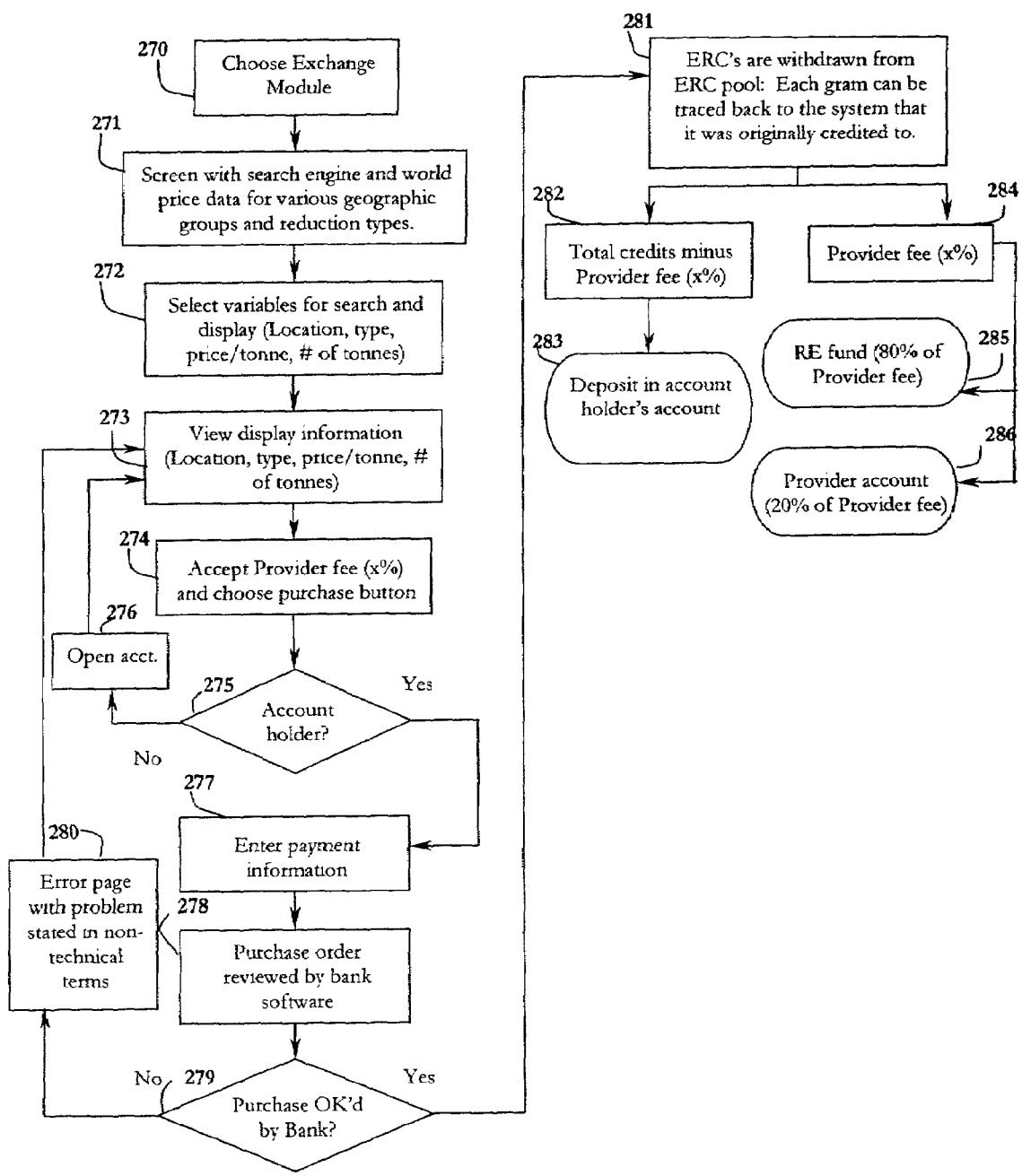
FIG. 16 describes the method of purchasing ERC's online.

FIG. 16 describes the Exchange Module 104. Here customers will be able to buy and sell ERC's (sometimes known as "carbon credits"). After choosing Exchange Module from the home page 270, a screen with a search engine and certain price data are displayed 271. Certain variables are user-selectable to choose a specific reduction type (Solar Thermal, Microhydro, etc.) and a particular country where the system is located 272. Upon viewing the information returned 273 (this cycle can be repeated until desired type, location, and price are found), the customer may decide to purchase. At that time, the customer reads and accepts the terms of trading on the exchange, including fees and any percentages that may apply 274. If they haven't previously created an account 275, they must do so at this point 276. This is done at this particular time to allow visitors to the site to view information on the exchange for free. Charges are only incurred when an account is opened and a transaction is made. Credit card (or other payment information) is then submitted 277, and an internal check is made 278 to insure that the payment amount clears, and that the account holder has trading permissions. If transaction does not clear this check 279, the customer is notified of the exact nature of the error, and is returned to the information display page 273. If the transaction is cleared by the bank 279, ERC's are withdrawn from the ERC Pool 281. The total amount of credits, minus a percentage to Provider 282, is then deposited in the customer's account. The amount of fee charged and percentage owed to Provider vary with amount of activity on the exchange. The Provider fee itself 284 is then divided. 80% 285 will go into the RE fund 206, and 20% 286 is put in the Provider account 205.

Figure 17:
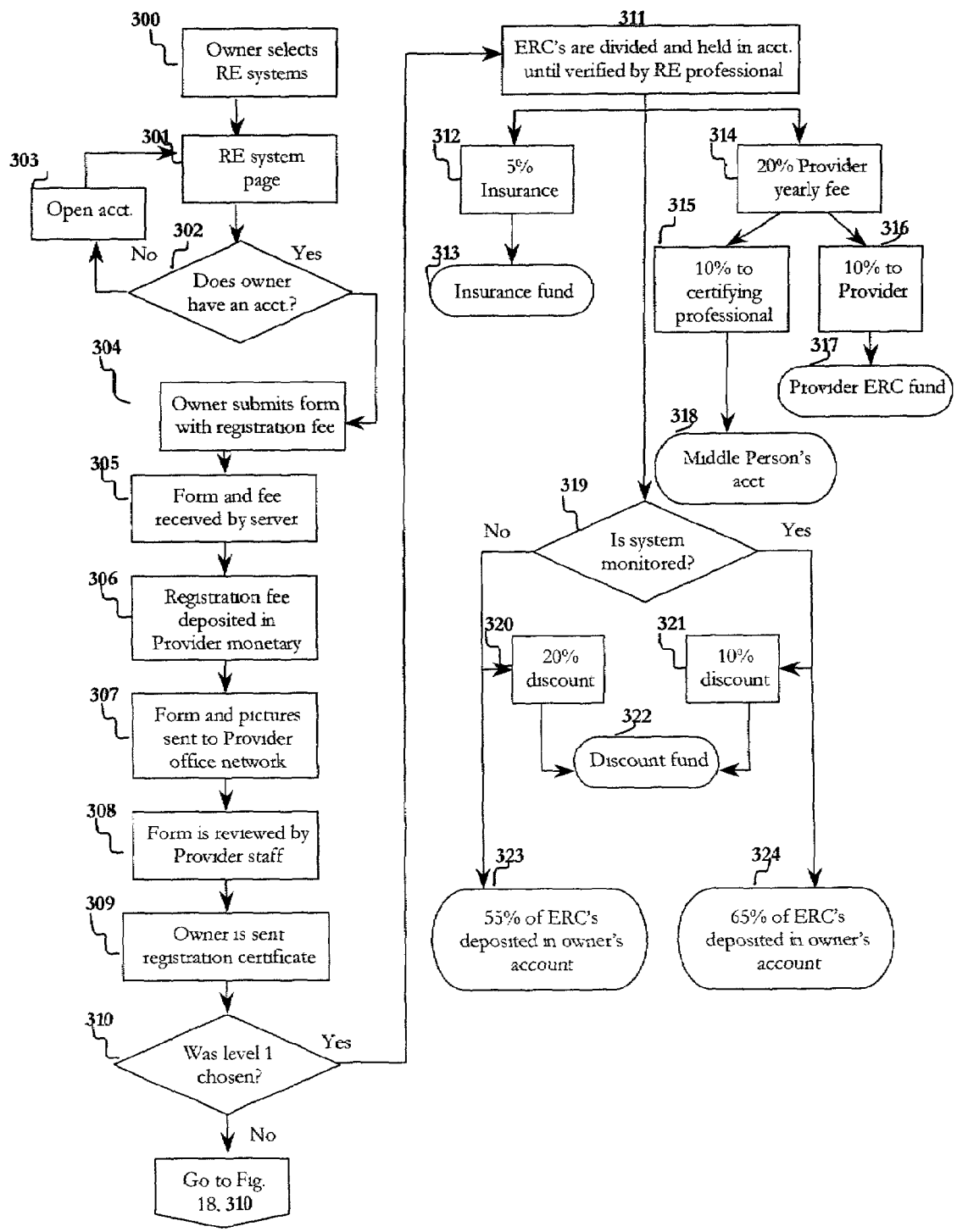
FIGS. 17-19 describe the method for the registration of a renewable energy (RE) system and application for ERC accreditation.
Figure 18:
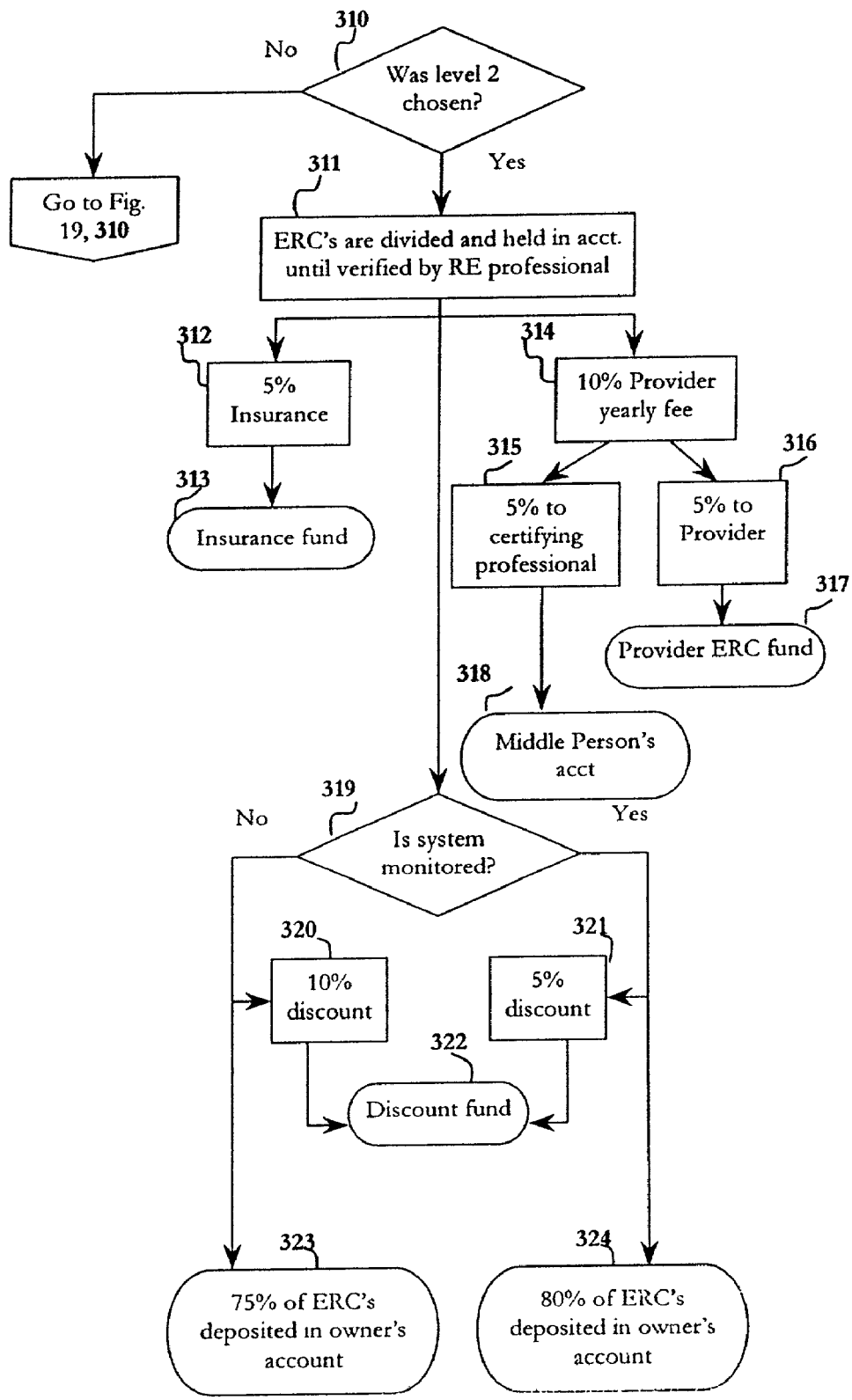
Figure 19:
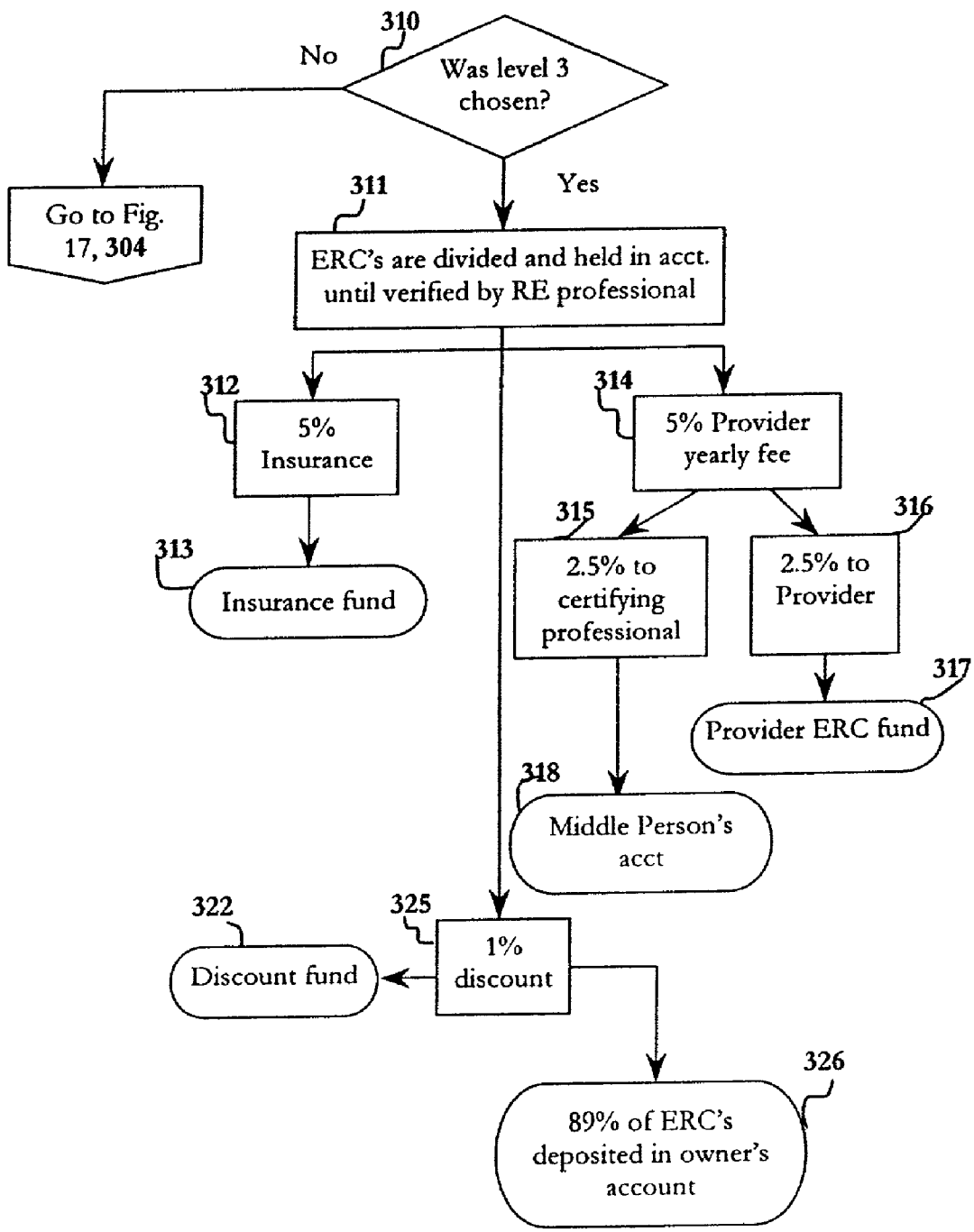

FIGS. 17-19 show the process of registering RE and other emission reduction systems. The owner (or a legally appointed representative) selects RE systems 300 from the home page and the RE systems page appears 301. If owner is not yet an account holder, he/she is sent 303 to Open Account 111. Owner then fills out the registration form, including pictures, and submits it with the registration fee 304. Form, pictures, and fee are received 305 by the server 28; registration fee is deposited 306 in Provider monetary transaction fund 220; and form and pictures are reviewed by Provider staff 308. The owner is then sent a registration certificate 309. Depending on the level chosen on the registration form 304, the ERC's credited to the system are preferably divided in the following way:

| Level 1 | Level 2 | Level 3 |
|---|---|---|
| 312 Insurance 5% | 312 Insurance 5% | 312 Insurance 5% |
| 314 Provider yearly fee 20% | 314 Provideryearly fee 10% | 314 Provideryearly fee 5% |
| 315 Certifier 10% | 315 Certifier 5% | 315 Certifier 2.5% |
| 316 Provider10% | 316 Provider 5% | 316 Provider 2.5% |
| Monitored system: | Monitored system: | Monitored system: |
| 321 Discount 10% | 321 Discount 5% | 321 Discount 1% |
| 324 ERC's to owner 65% | 324 ERC's to owner 80% | 324 ERC's to owner 89% |
| Unmonitored system: | Unmonitored system: | |
| 320 Discount 20% | 320 Discount 10% | |
| 323 ERC's to owner 55% | 323 ERC's to owner 75% | |

Figure 20:
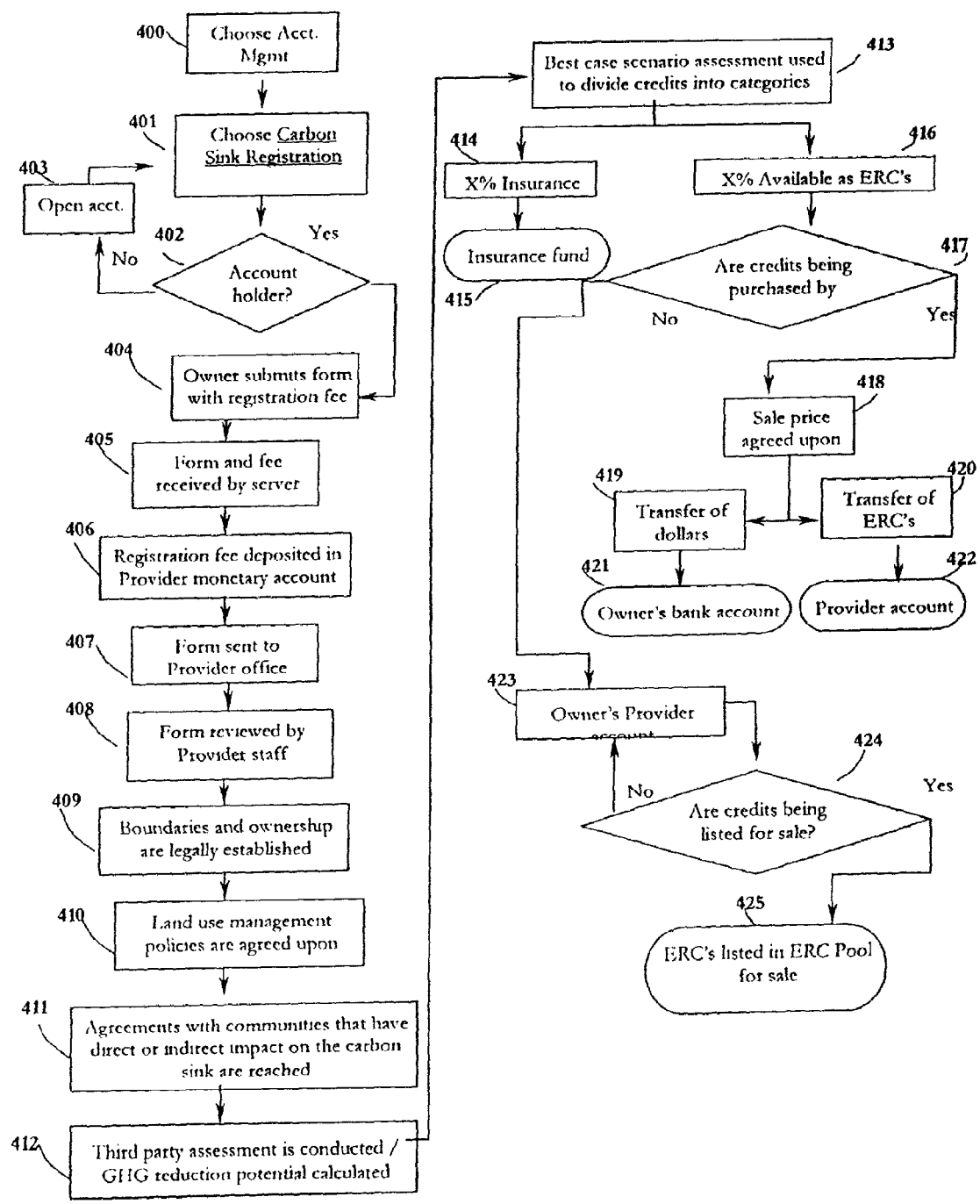
FIG. 20 describes the method for the registration of a forest as a carbon sink and application for ERC accreditation.

FIG. 20 describes the process of registering a Biological (forest, soils, etc.) or Geological (deep well injection) Carbon Sink. From the home page, the owner (or a legally appointed representative) chooses 401 Carbon Sink Registration 117. If not account holder 402, registrant must use 403 the Open Account screen 111. Owner fills out form and submits it with the registration fee 404. Form and fee are received 405 by the server 28. Registration fee is deposited 406 in the Provider monetary account 220, and the form is sent to the Provider office 407 for review by the staff 408. Through communication with the owner, the necessary legal paper work establishing the property boundaries and ownership of the Bio or Geo sink are obtained 409 and land use management policies are agreed upon 410. The surrounding communities are contacted, and agreements regarding their impact on the sink are reached 411. Third party assessment is arranged and conducted 412. The best-case scenario calculations presented by the third party are used to credit the sink 413. A percentage of the ERC's are then put in an account as insurance 414 against natural disaster and possible breach of land use and/or community impact agreements. Given the short time that calculations of this type have been studied, this insurance percentage will be assigned on a case-by-case basis. If Provider is purchasing the credits 417, then a sale price is agreed upon 418 and dollars are transferred 419 to the owner's monetary bank account 421. The ERC's thus purchased are deposited 420 in Provider's account 205. If the owner decides to keep the credits, they are held in his/her account with Provider 201. Should the owner decide to sell the credits, he/she may list 424 them for sale from the ERC Pool 207. From here 425 they may be sold FIG. 8,210 to a carbon source as offset, or through the Exchange Module. The ERC's may also be donated FIG. 8, 211 to Provider or to the RE fund. They may also be retired from circulation. This last option is available since some parties do not believe in credit trading, and would not like to see the credits sold to a carbon source or traded on the exchange.

Figure 21:
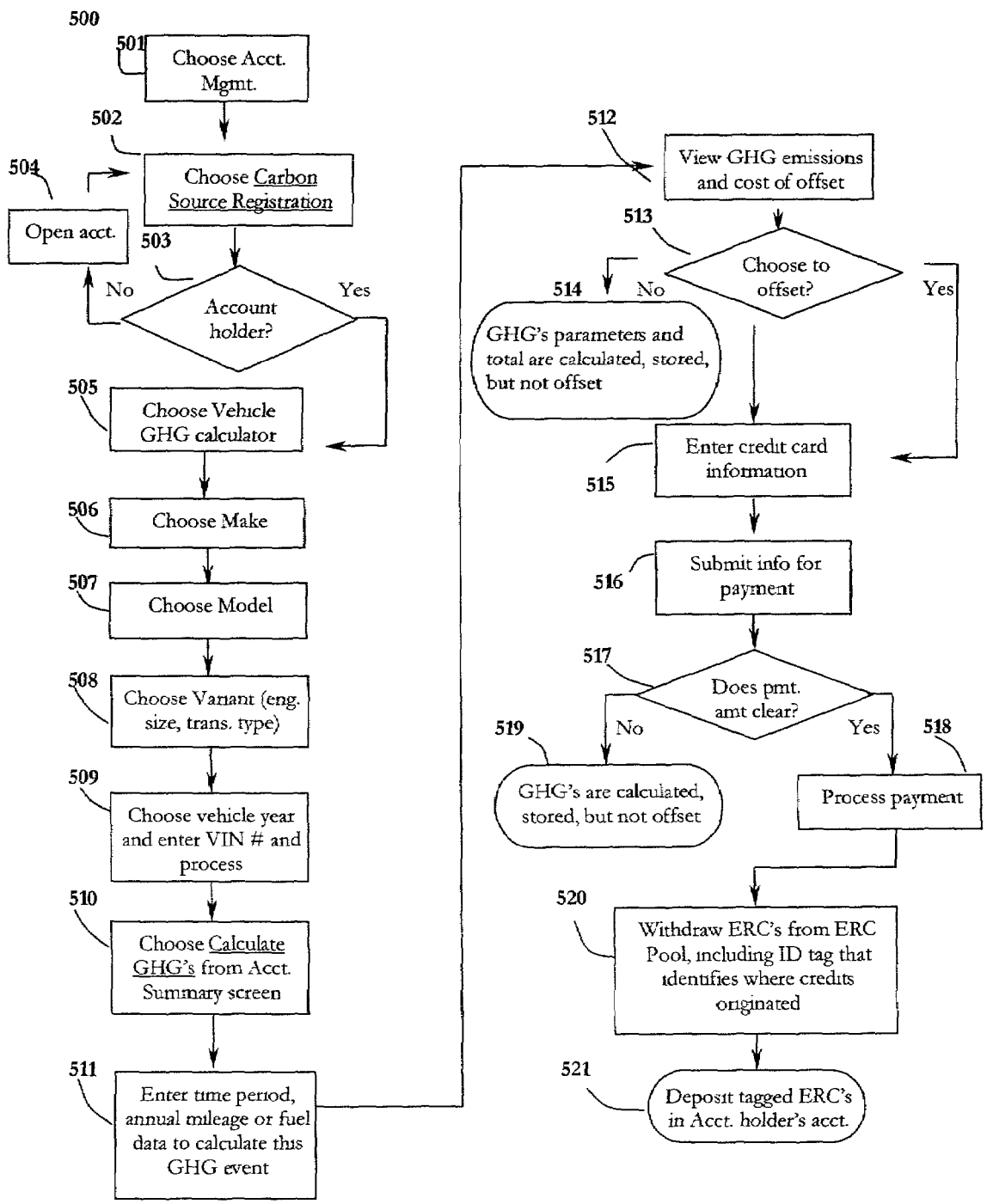
FIG. 21 describes the method for the registration of a vehicle as a carbon source and purchase of ERC's as offset.

FIG. 21 describes the process of registering a vehicle as a carbon source 500. From the home page, the user will choose Account Management 501, then Carbon Source Registration 502. If the user does not have an account 503, and did not open one while coming through Account Management, the user is prompted to do so and directed 504 to the Open Account screen 111. On the Carbon Source Registration page, the user chooses Vehicle 505 as source type and enters the Make 506, the Model 507, the engine size and transmission type 508, and model year and VIN number 509. The user is then shown the Account Summary screen with the vehicle just registered listed, and given the opportunity to choose to offset the vehicle's emissions 510. Next, the user is asked for the approximate (or exact, if known) city and highway miles driven or fuel data 511 for the period being offset. After viewing the emission information 512 the user is invited to offset the emissions 513. At this point the user can choose to store the parameters and title of this GHG event 514, or enter 515 and submit credit card information 516. If the credit card amount clears, payment is processed 518, and ERC's are withdrawn from the ERC Pool 520, and recorded in account holder's account 521. Here they have "retired" status, that is, they cannot be sold or traded. If the credit card doesn't clear, the GHG event is recorded into the account to be possibly offset at a later date 519.

Figure 22:
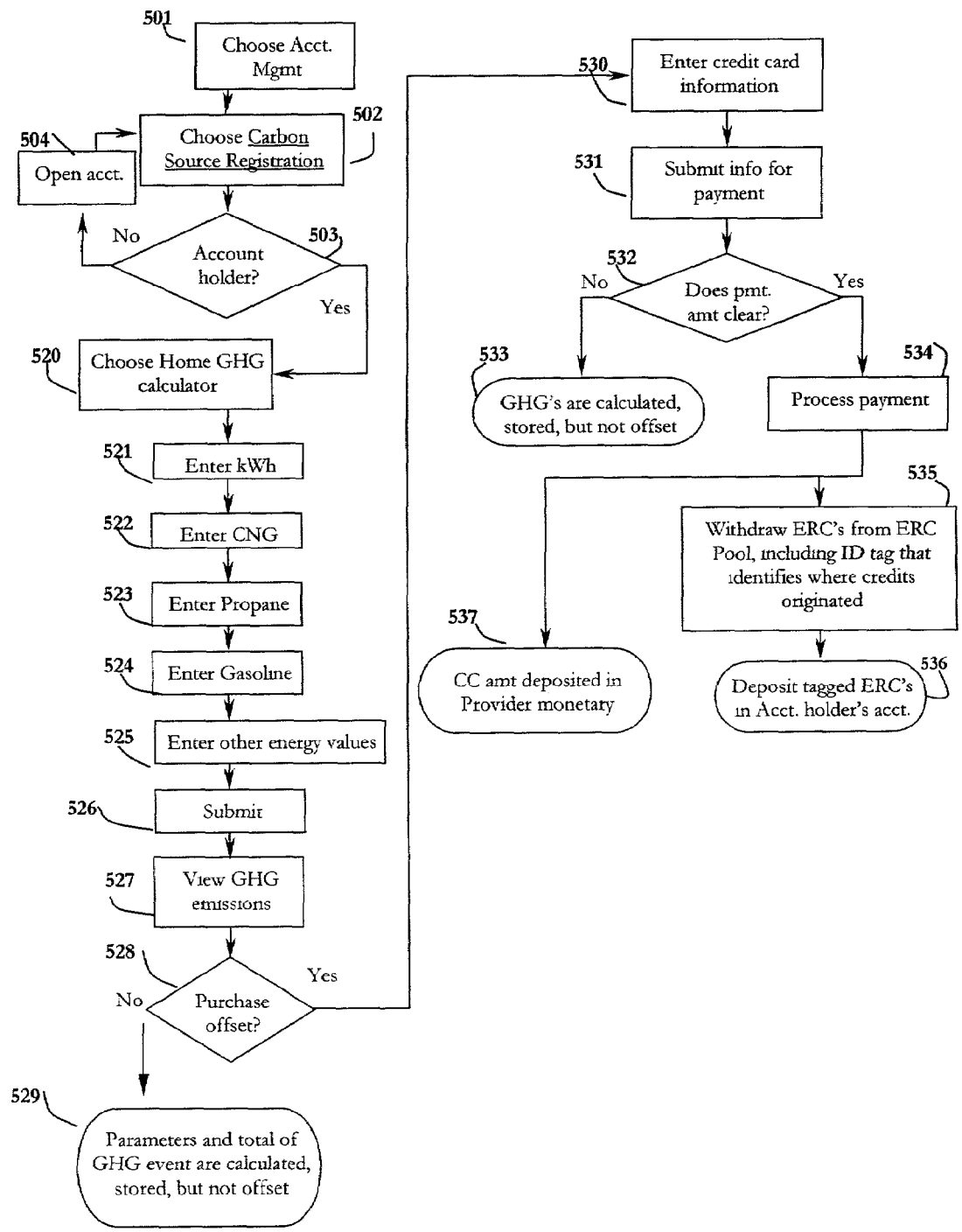
FIG. 22 describes the method for the registration of a home as a carbon source and purchase of ERC's as offset.

FIG. 22 shows how a home is registered as a carbon source. From the home page, the user will choose Account Management 501, then Carbon Source Registration 502. If the user does not have an account 503, and did not open one while coming through Account Management, the user is prompted to do so and directed 504 to the Open Account screen 111. From the Carbon Source Registration page, choose Home as the GHG calculator 520. Users will enter the values for kilowatt-hours 521, compressed natural gas 522, propane 523, gasoline 524, and other energy values 525, submit them 526, and the database calculates the GHG emissions associated with the values 527. Should users decide not to purchase offsets, they may store the GHG events and its parameters in their account 529. If users decide to purchase, they will enter their credit card information 530 and submit it 531. The payment will be processed 534, and ERC's will be withdrawn from the ERC Pool 535 and deposited in account holder's account 536.

Figure 23:
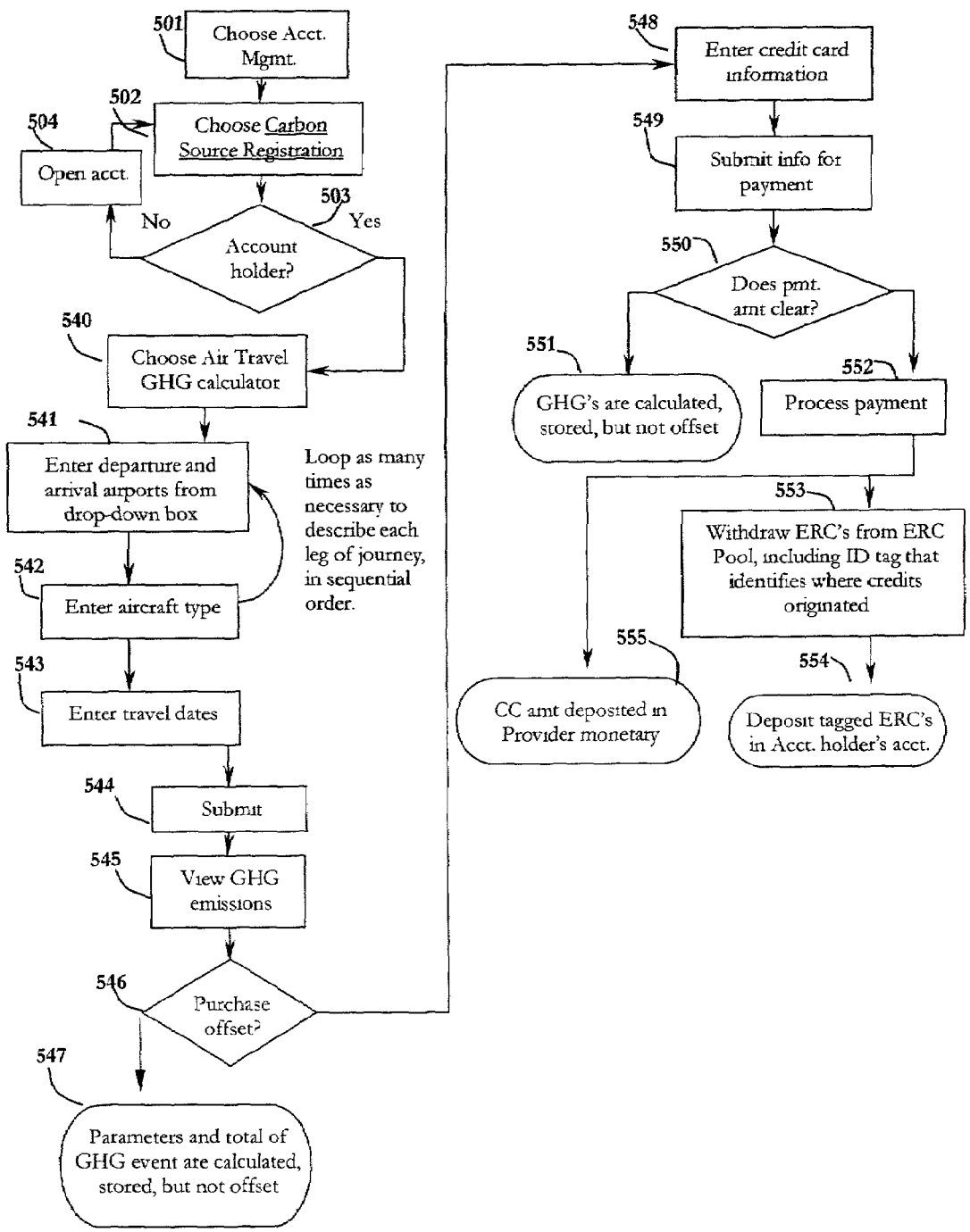
FIG. 23 describes the method for the registration of air travel as a carbon source and purchase of ERC's as offset.

FIG. 23 describes the process of registering air travel as a carbon source. From the home page, the user will choose Account Management 501, then Carbon Source Registration 502. If the user does not have an account 503, and did not open one while coming through Account Management, the user is prompted to do so and directed 504 to the Open Account screen 111. After choosing the air travel GHG calculator 540, users are asked to enter their departure and arrival airports 541 and the aircraft flown 542 one leg at a time, repeating until flight schedule is complete, including stop-overs. Entering the travel dates 543 helps to identify this particular flight schedule, so that it can be displayed to the users as a GHG event in their account. Upon submission 544, and review of the GHG emissions data 545, the decision to purchase ERC's 546 to offset or not is presented. Should users decide not to purchase offsets, they may store the GHG events and its parameters in their account 547. If users decide to purchase, they will enter their credit card information 548 and submit it 549. The payment will be processed 552, and ERC's will be withdrawn from the ERC Pool 553 and deposited in account holder's account 554. If the credit card doesn't clear, the GHG event is recorded into the account to be possibly offset at a later date 551.

Figure 24:
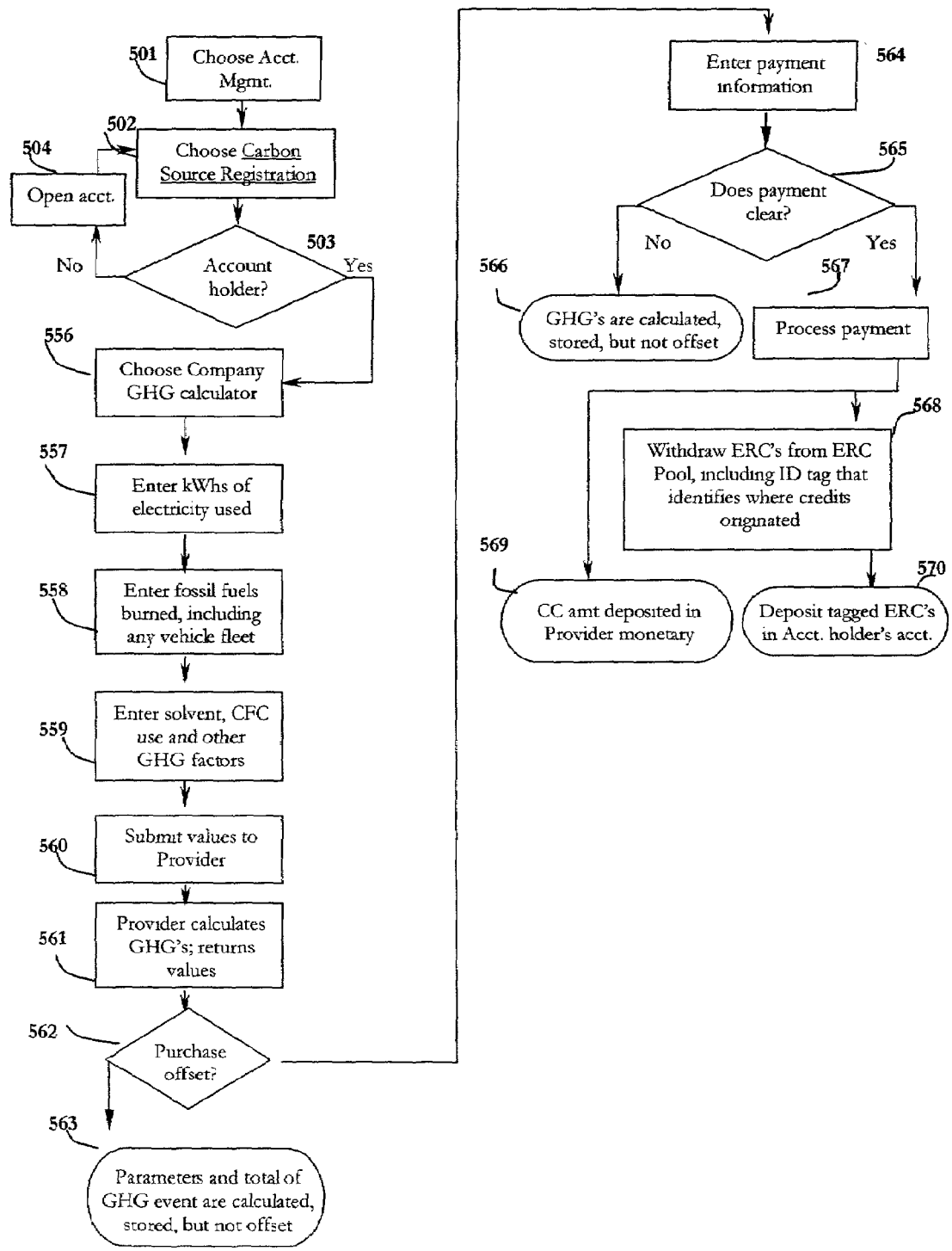
FIG. 24 describes the method for the registration of a company or product as a carbon source and purchase of ERC's as offset.

FIG. 24 shows how a company or organization is registered. From the home page, the user will choose Account Management 501, then Carbon Source Registration 502. If the user does not have an account 503, and did not open one while coming through Account Management, the user is prompted to do so and directed 504 to the Open Account screen 111. By selecting the Company Activity GHG calculator, users are given a form to fill out. They will enter kilowatt-hours used 557, fossil fuel used 558, solvent, CFC and other use 559, Users submit values 560, and GHG's are calculated for review 561. At this point user can choose to store the parameters of this set of events 563, or submit payment information to acquire offset 564. Payment amount is processed 567. ERC's are withdrawn from the ERC Pool 568 and deposited in the account holder's account 570.

Figure 25:
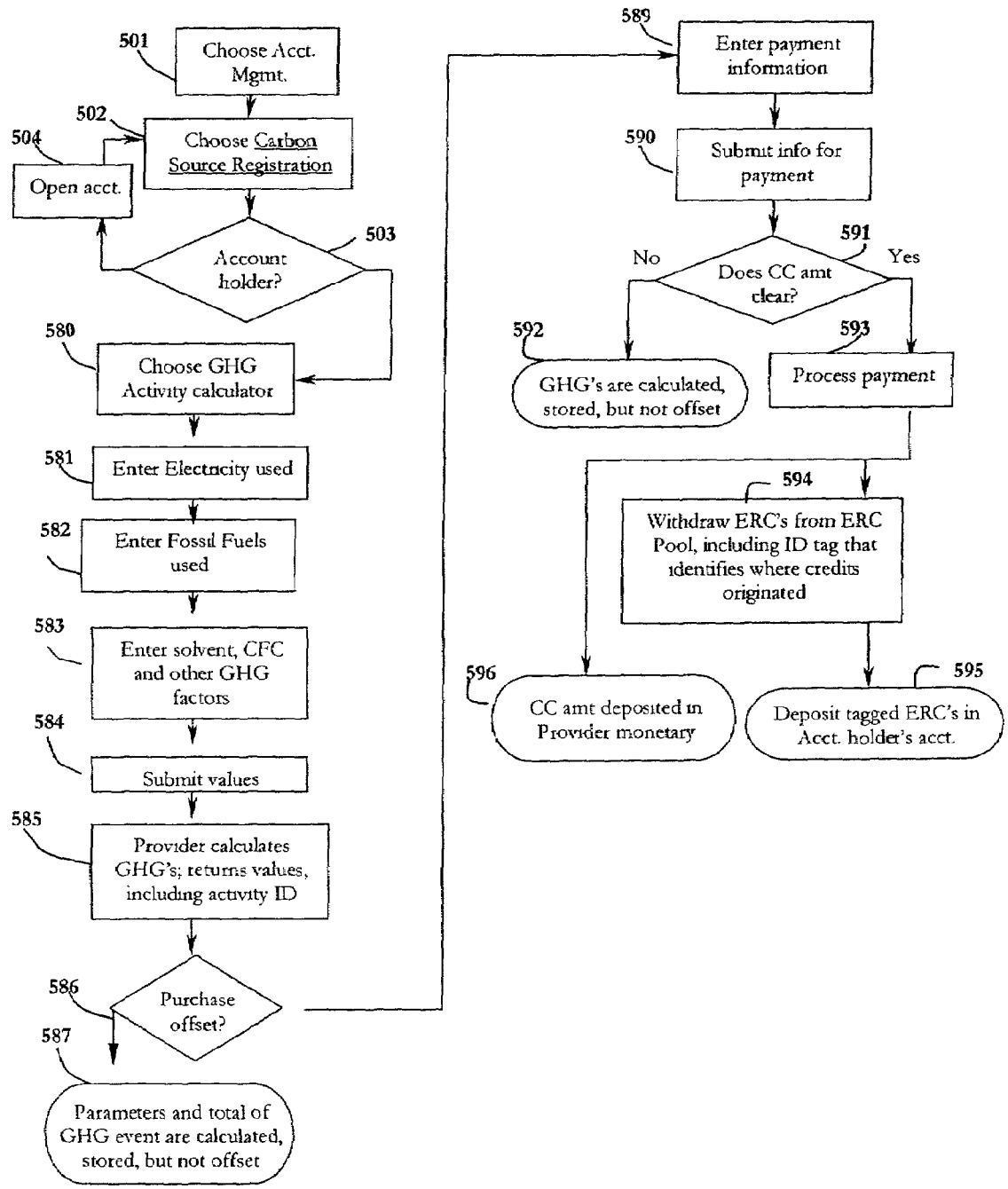
FIG. 25 describes the method for the registration of an activity (such as barbeques, ATV use, etc.) as a carbon source and purchase of ERC's as offset.

FIG. 25 describes the concept of registering a GHG activity or set of activities, such holding a BBQ, manufacturing shoes, generating electricity, providing a delivery service, etc. as a carbon source. From the home page, the user will choose Account Management 501, then Carbon Source Registration 502. If the user does not have an account 503, and did not open one while coming through Account Management, the user is prompted to do so and directed 504 to the Open Account screen 111. After choosing GHG Activity calculator 580, the user enters their kilowatt-hours used 581, fossil fuels burned (including any fleet vehicles involved) 582, and solvent use and other GHG factors 583. This information is received by Provider and calculations are made to assess the GHG production of the product/service above 584. The values are returned expressed in tons of GHG's, including the price to offset and the unique ID identifying the profiled activity 585. Users are invited 586 to choose to store GHG and activity information 587 or enter and submit payment information 589, 590. Upon processing 593, ERC's are withdrawn from the ERC Pool 594 and deposited in the account holder's account 595. If the payment doesn't clear 591, the GHG event and its parameters are stored for later consideration 592. Companies and organizations completing this process are eligible to receive a logo stating that the product is Certification, which they may display on service announcements, the product or product packaging. This may also be accomplished on-the-fly by utilizing a database within the client company and communicating with it through the process outlined in FIG. 14, Using an External Database to Register a Carbon Source, and further described in Interaction between POS like System and Provider Platform FIG. 26.

Figure 26:
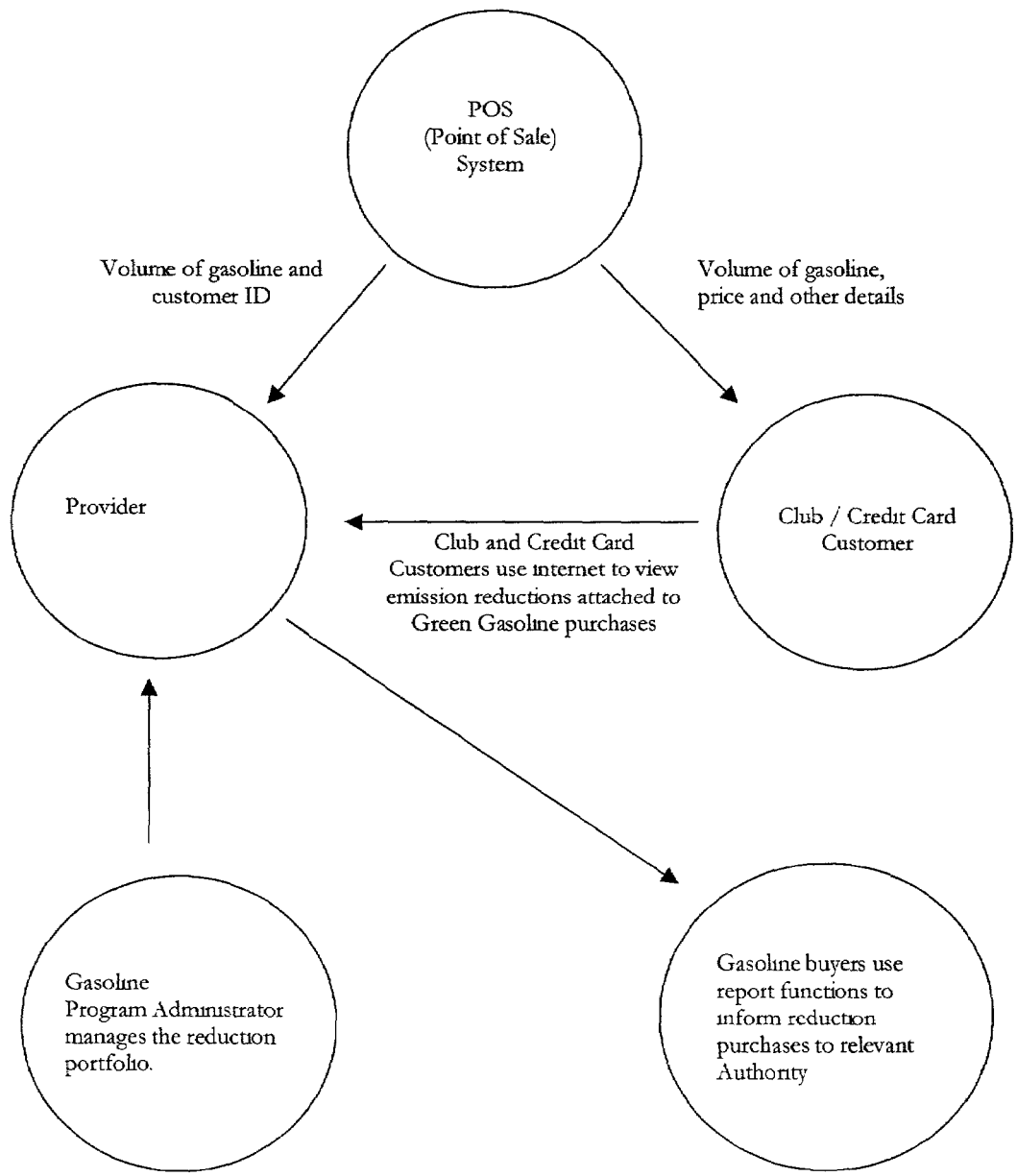
FIG. 26 illustrates a method for interaction between the Provider platform and Point of Sale systems to provide reductions for gasoline purchases, shipping and other services.

FIG. 26 shows the Interaction between POS (Point of Sale) like System and Provider Platform. The Provider platform translates fuel use into emissions and dynamically acquires reductions from the portfolio managed by the Gasoline Program Administrator. Depending on the customer needs, reductions can be sourced by type, from domestic or international activities. This type of set up can be used to dynamically offset services provided by airlines on regular or Frequent Flyer programs, shipping services such as UPS and other services where customer profiles and service information data are managed in the database systems, or services whose activities are recorded through credit cards, chip cards and wireless data tracking systems. Specifically, the POS system provides the volume of gasoline and customer identification to the Provider platform and provides the volume of gasoline, price and other details to the Club/Credit Card Customer. The Club/Credit Card Customer use the internet to view emission reductions attached to Gasoline purchases. The Gasoline Program Administrator manages the reduction portfolio. The Gasoline buyers use report functions to inform reduction purchases to relevant Authority.

Figure 27:
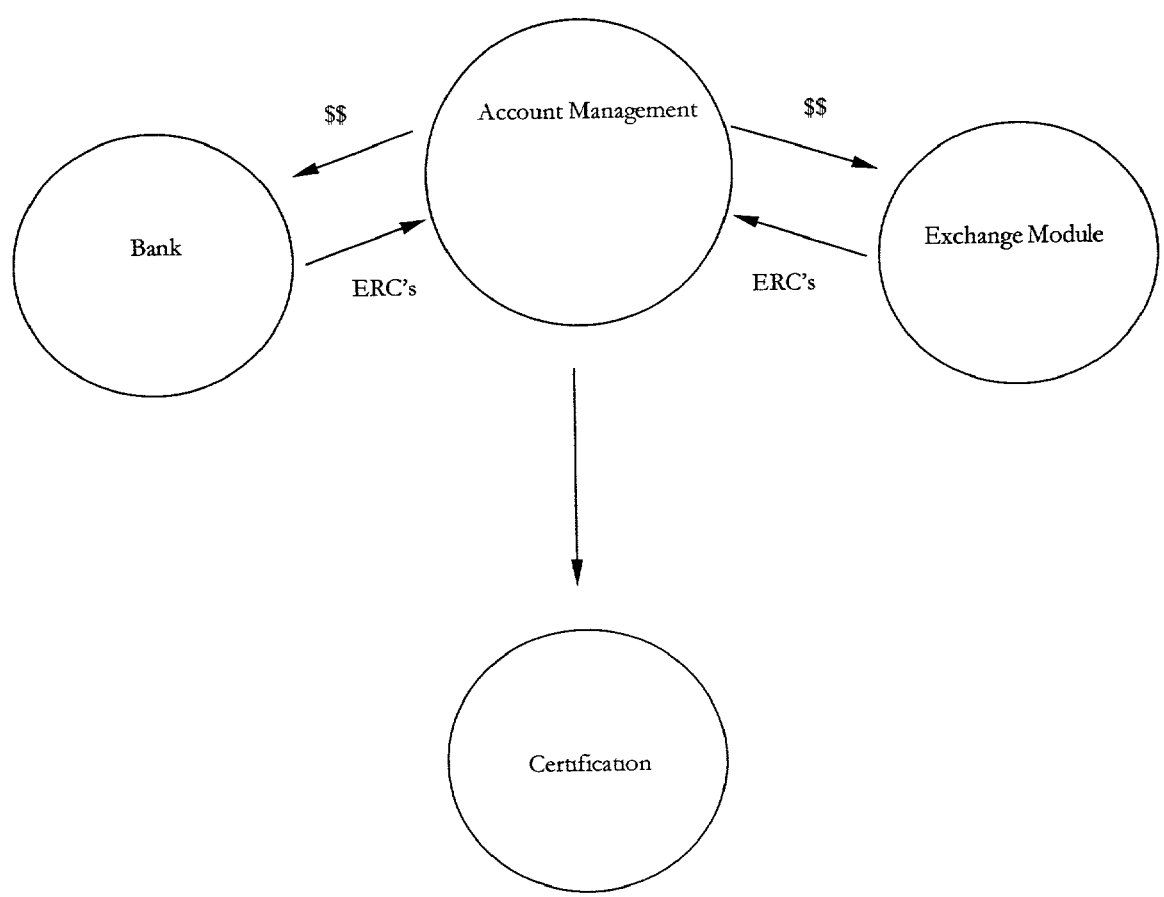
FIG. 27 shows how users can project GHG activities as GHG neutral using various functions of the platform.

FIG. 27 shows how users can project GHG activities as GHG neutral using various functions of the platform. The Account Management is the central to the Exchange Module, the Bank and the Certification (occasionally referred to herein as "ClimateSafe™" certification, wherein ClimateSafe™ is a certification mark of International Carbon Bank and Exchange). In Account Management, carbon sources are profiled, then offset by acquiring ERC's from Exchange Module, Bank, or by introducing one's own ERC's. Moreover, GHG activities and its offset(s) embodied by the transaction identification is projected as GHG neutral using Certification Mark or other brand name. ERC's flow from the Carbon Exchange and Bank to the Account Management. Monetary values flow from the Account Management to the Bank and Exchange Module.

Figure 28:
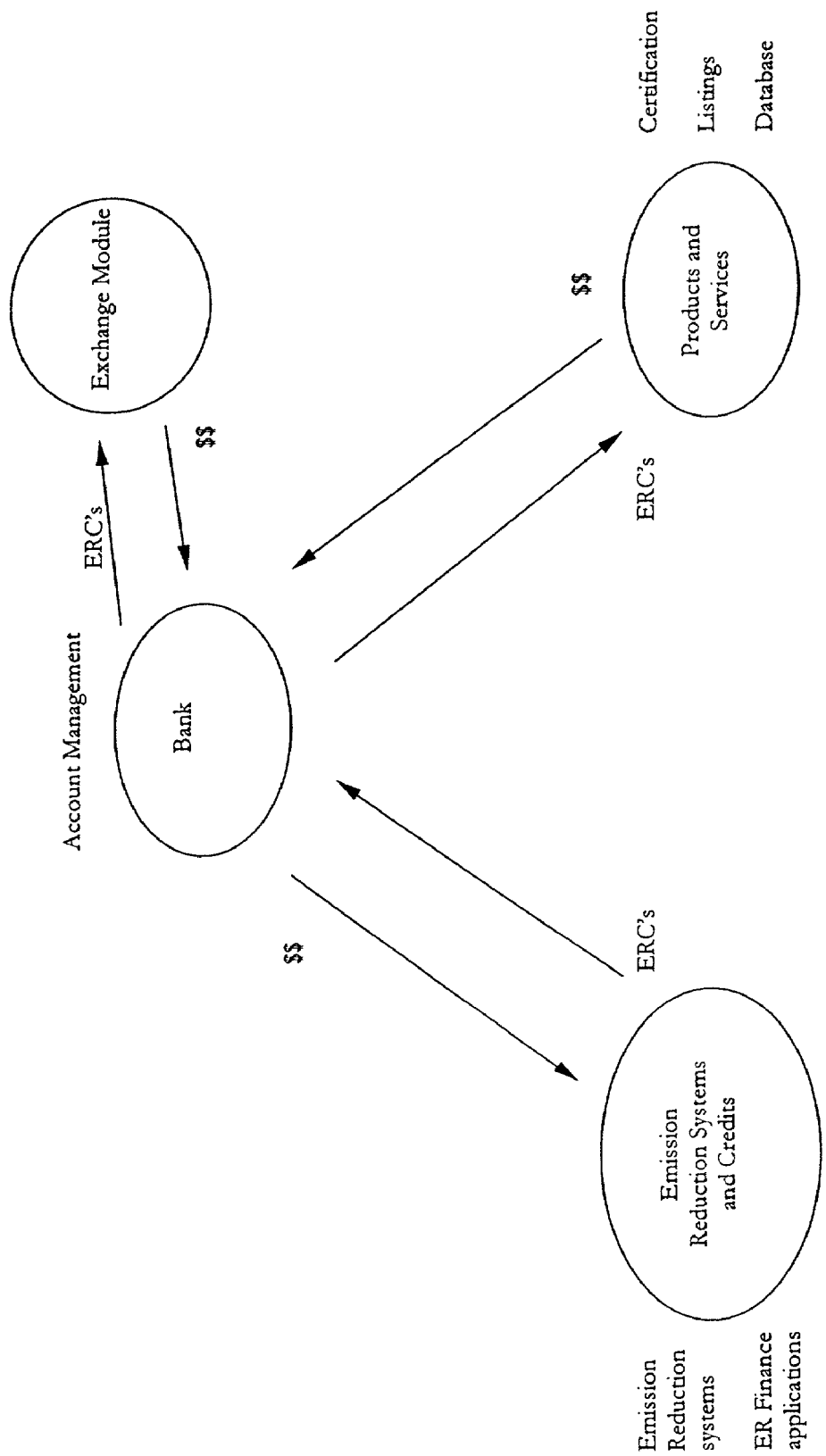
FIG. 28 illustrates ERC and money flow on the Provider platform, and several revenue opportunities made possible by the platform.

FIG. 28 illustrates ERC and money flow on the Provider platform, and several revenue opportunities made possible by the platform. The Provider platform facilitates various synergistic revenue cells: 1). Account Management: users pay fees relative to usage amount; 2). Exchange module: credits are bought and sold, the Provider collects transaction fees; 3). Certification Mark labeling: users pay to have products and services certified as GHG neutral; 4). Emission Reduction registration: users pay a one time fee and a yearly % of credits to have reduction legitimized; 5). Advertising by Manufacturers and Professionals: providing GHG mitigation services; 6). RE financing: finance charges are collected on Emission Reduction systems; 7). Custom Solutions: customization of the application for particular users; and 8). Subscription fees for related informational services such as a database. The monetary flow includes money from Bank going to pay out emission reduction systems and finance future reductions. Money also flows from certification labeling, database listings and other paid-for services to the Bank. Credits from Emission Reduction systems go to the Bank for use in individual accounts, the exchange module, and GHG neutral products.

Figure 29:
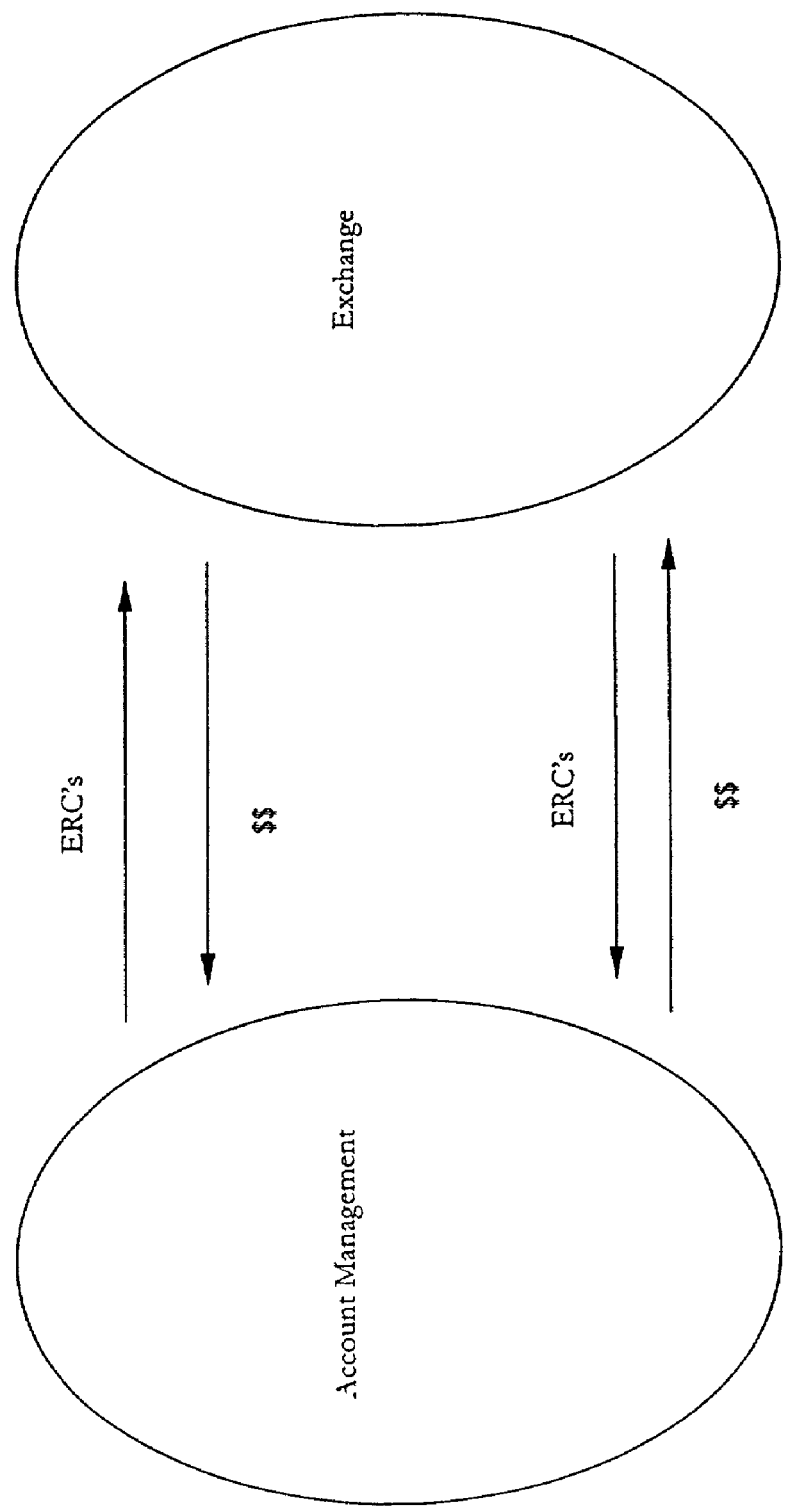
FIG. 29 illustrates a method of linking an accounting module and an exchange module.

FIG. 29 illustrates a method of linking an accounting module (Account Management) and an exchange module (occasionally referred to herein as "Exchange Module™", wherein Exchange Module™ is a service mark of International Carbon Bank and Exchange). IN the Account Management module, carbon sources and carbon sinks are calculated and legitimized. To sell legitimized ERC's, desired price range is described and ERC's are made available at the exchange module. Users can also acquire and import ERC's from the Exchange Module to lower their GHG bottom line. This provides accounting and trading functions in a single system. In the exchange module, buyers encounter ERCs, describe desired price range and other preferences, and match bids are processed.

Figure 30:
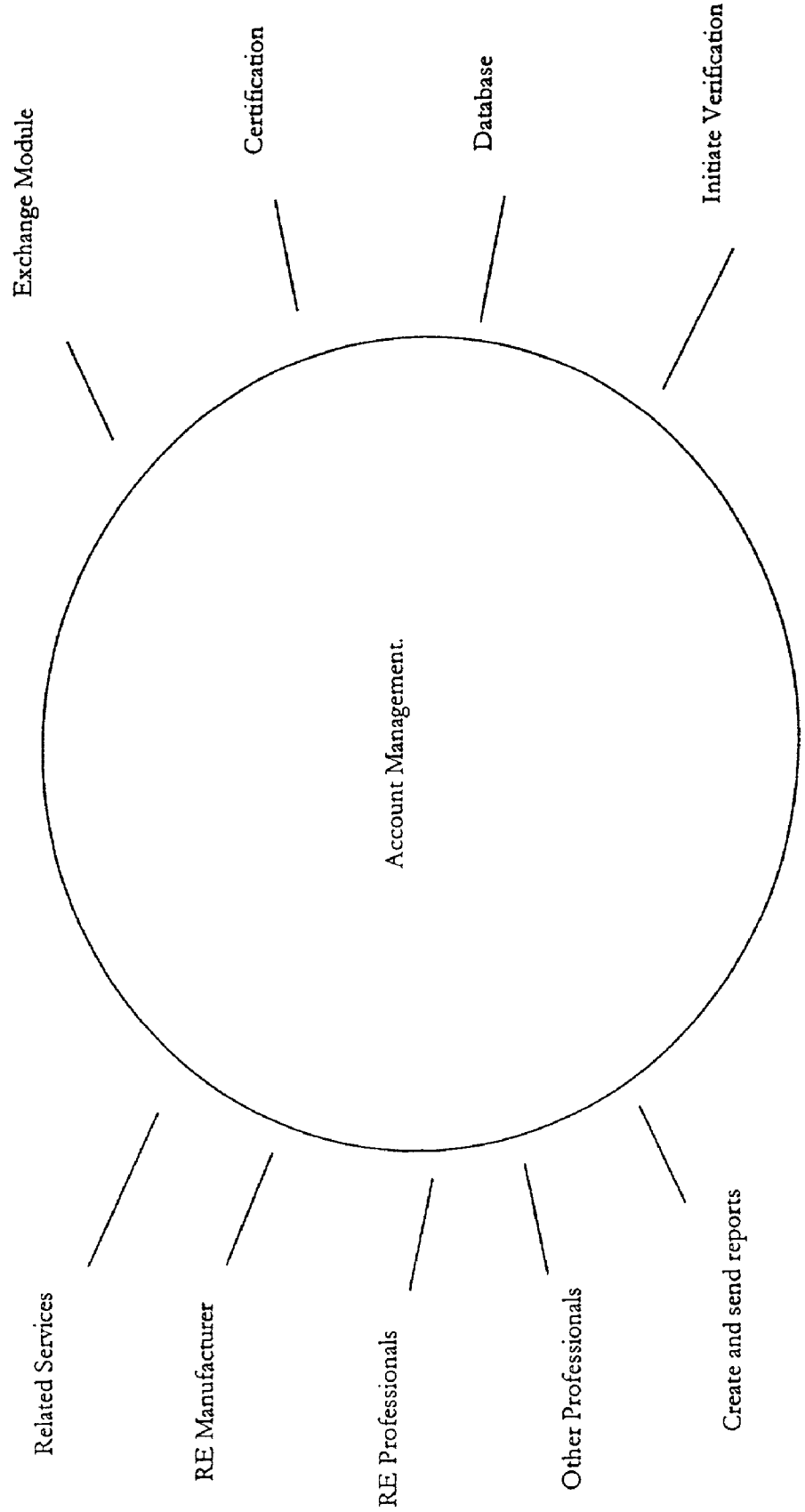
FIG. 30 shows functionality available from Account Management.

FIG. 30 shows functionality available from Account Management. Account Management functions include: 1. Profile and record emissions 2. Profile and record emission reductions 3. Initiate verification process 4. Output reports 5. Process and Send reports to Government Authorities, including via internet 6. Send ERC's to Exchange Module 7. Acquire ERC's from Exchange Module 8. Maintain User Profile 9. Open and manage RE Professional, manufacturer, Government, NGO Related Services, GHG Neutral Certification and other account types 10. Attach GHG's to specific GHG events, products, services, etc. 11. Display GHG Neutral Activities and manage labeling of GHG neutral activities 12. Manage monetary aspects of interacting with Provider, including receiving money for ERC's, paying for ERC's, managing subscription, advertising and listing fees. 13 Create VGT maps 14. Review validity of listed ERC's. 15 Manage interaction with External Systems.

Figure 31:
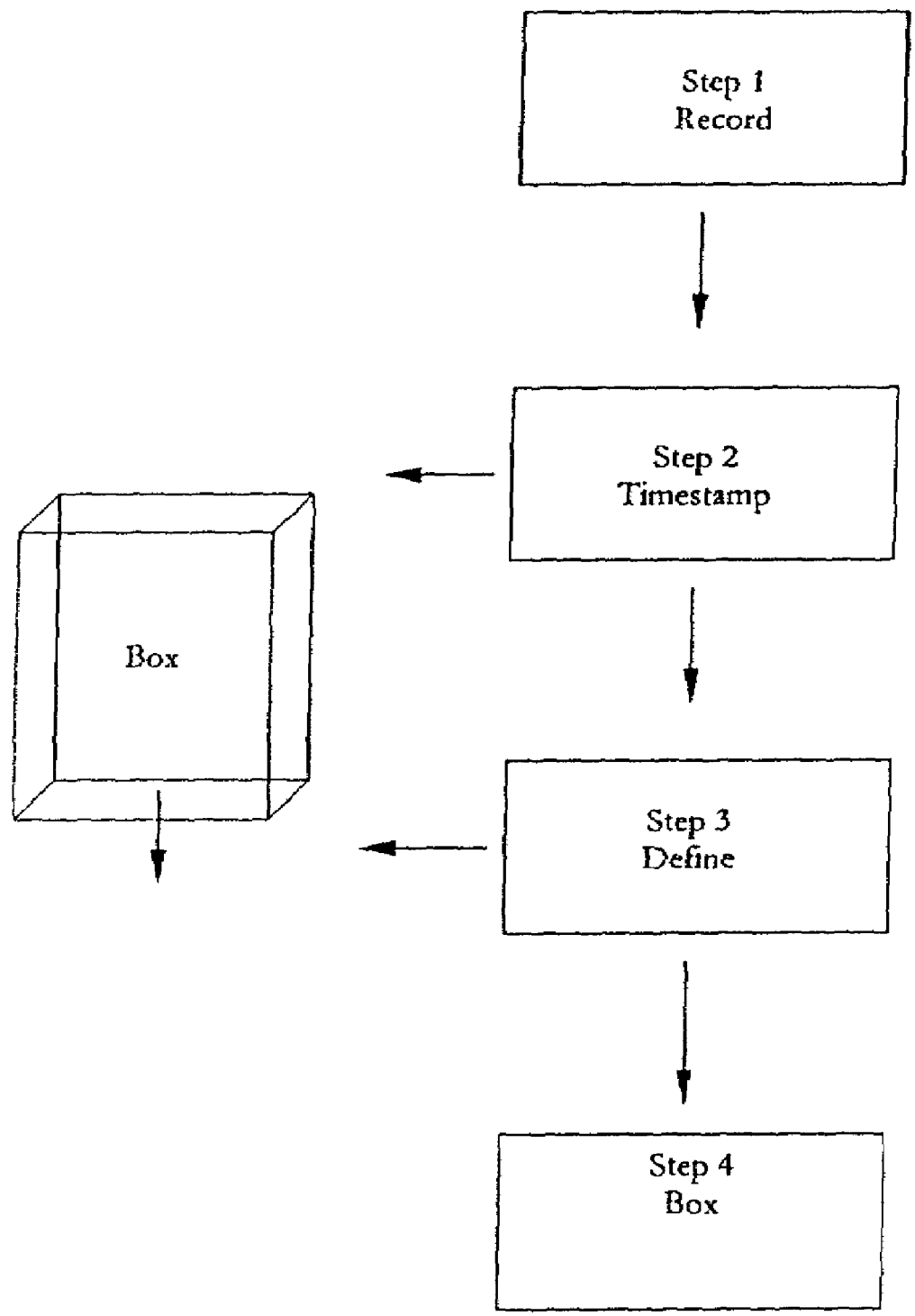
FIG. 31 describes a method of mapping GHG emissions information using various parameters.

FIG. 31 describes a method of mapping GHG emissions information using various parameters. The VGT helps visualize an otherwise invisible commodity, provides security by enabling the labeling of parts of the earth and atmosphere one cubic unit at the time. A VGT is also a useful aid to manage the imaginary transfer of GHG reductions to offset emissions by, for example, projecting and transposing 'empty' boxes on top of full boxes. A VGT is precise, and can be expressed in grams, cubic centimeters, or in total molecules. The basis is found in Chemistry, where it is known as Charles's Law. The Law states; the volume for a given mass of gas is directly proportional to its temperature on the Kelvin scale when the pressure is held constant. $V \propto T$. For VGT purposes, pressure (P) is kept at sea level (760 torr or one atmosphere) for any location on earth, the temperature is derived for the mean global temperature as reported by the World Meteoroligical Organization (WMO), and the time progresses in whole year increments.

| Example Box: | GPS coordinates: |
|---|---|
| Width = 8.12 m | North 29°40.403' |
| Length = 8.12 m | West 082°24.835' |
| Height = 8.12 m | Elevation: 64 m |
| Volume = 536 m$^3$ | |
| Temperature = 15° C. | |
| Pressure = 760 torr | |
| Weight = 1000 kg CO2 | |

A GHG activity record is started. Location, address, GPS, elevation, GHG parameters and time frame of event are recorded. The Volumetric GPS Timestamp, a virtual box representing the emission or reduction volume of a GHG, is created. The VGT box occupies a discreetly defined space on planet earth, with the GPS and elevation coordinates anchoring the bottom center of the VGT box. The VGT box serves as a marker, aiding discovery of emission and reduction information introduced that has the same time frame, location, or volume.

Figure 32:
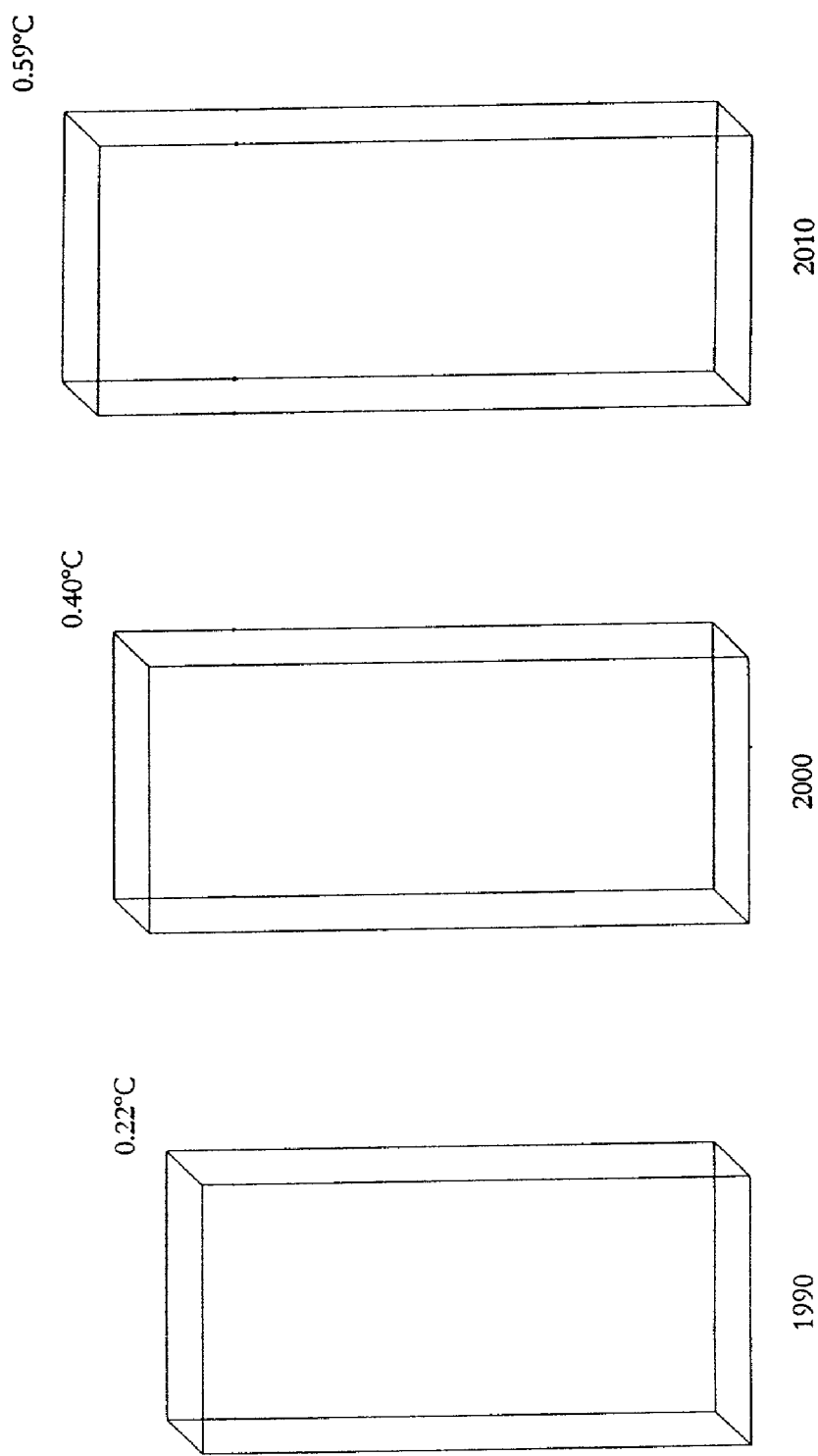
FIG. 32 describes the method for comparing emissions impact using temperature as a factor.

FIG. 32 describes the method for comparing emissions impact using temperature as a factor. The chart shows how the volume of one ton CO2 becomes lager over time. This is a result of increasing temperature, which expands the volume of any given gas. The mean temperature used as the baseline is arrived at by averaging the land, air and sea surface temperatures of planet earth from 1961-1990. The increase in temperature from that baseline expands the CO2 VGT box, and the relative increase in size is used to compare the value of current action versus future action. The other factor, pressure is kept constant at 760 torr in the equation $V \propto T$.

Figure 33:
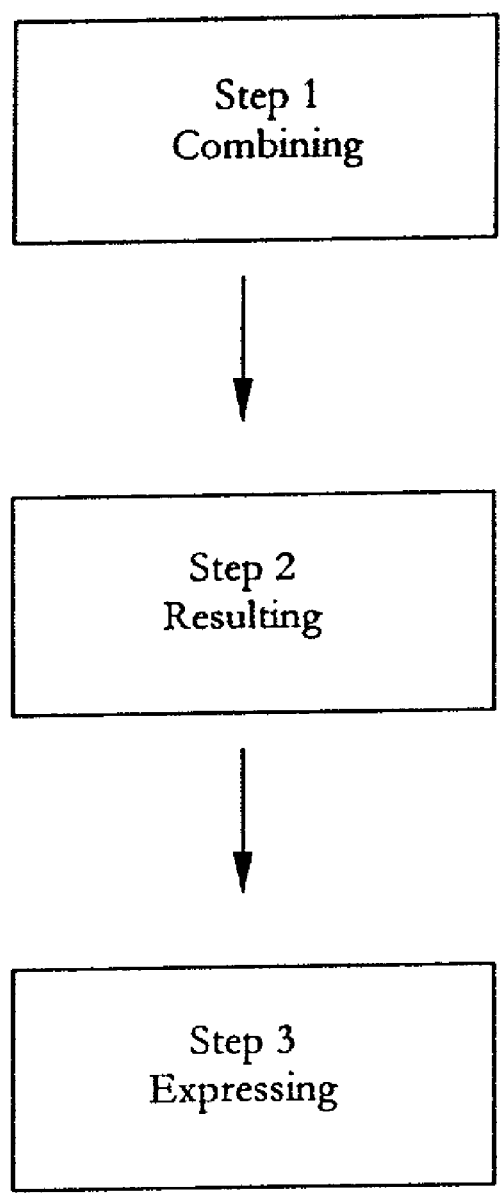
FIG. 33 describes method of calculating the proportion clean and dirty air generated as a result of a GHG activity.

FIG. 33 describes method of calculating the proportion clean and dirty air generated as a result of a GHG activity. The proportion of O2 consumed in the realization of GHG's from fossil fuels is based on the carbon makeup of that fuel. This in turn determines the molecular composition of the resulting GHG. E.g., there are 2 parts O for every part C. Hence=CO2. The reverse is also true, e.g., for every part C sequestered by a trees and other bio matter, 2 parts O are freed up. Step 1) VGT is established by combining location, elevation, time fame, GHG parameters and time frame of GHG activity. Step 2) Resulting VGT is used as the base to calculate the VGT of Oxygen and other molecules consumed or freed up by GHG activity. Step 3) A VGT of Oxygen and other molecules expresses the amount of "clean air" lost or gained from the GHG activity.

Figure 34:
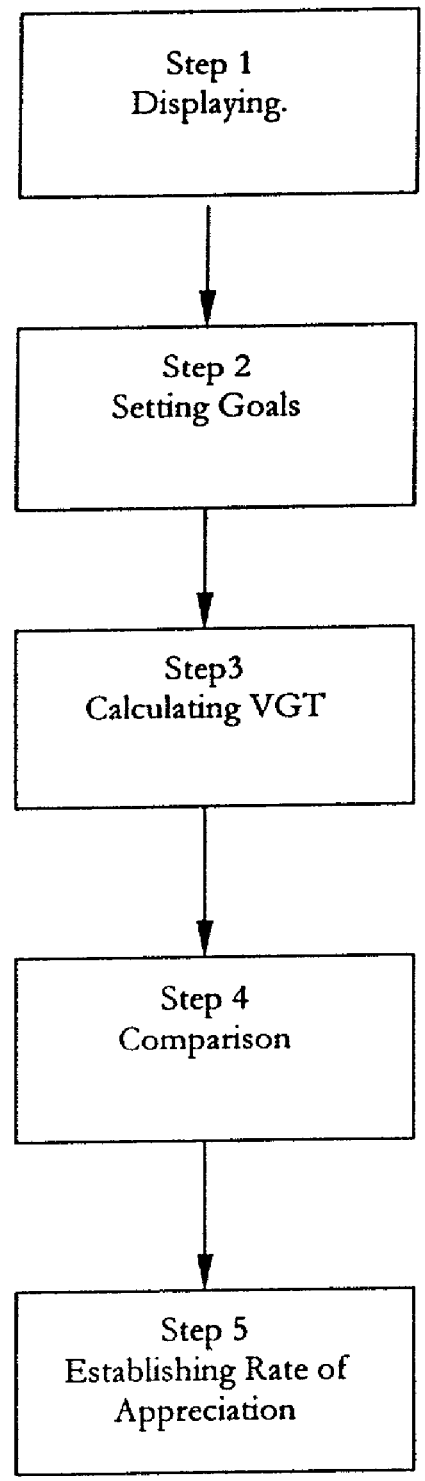
FIG. 34 describes a method for using public opinion to determine the value of GHG reductions.

FIG. 34 describes a method for using public opinion to determine the value of GHG reductions. Note: by combining time with temperature and ppm, the public desire can become a factor in determining the price of GHG reductions. The time element is used to establish an appreciation table in which the value of GHG reductions can be measured based on the popular goal. If the rate of annual reductions is higher than that of the table, the value of a single ton of GHG reduction in that year decreases. If the rate of annual reduction drops below the table, the value of achieving one ton of GHG reduction increases. Thus public desire can be used to provide a factor for determining GHG reduction values. Step 1) Current parts per million (ppm) of CO2 in atmosphere, or temperature is displayed. Step 2) Account holder is invited to express desired global ppm and or average earth temperature and the time fame by which this has to be achieved. Step 3) VGT of one ton CO2 is established based on popular input, by averaging desired ppm, temperature and time frame of public submissions. Step 4) The above VGT is compared to the current VGT of one ton CO2. Step 5) The relative difference in volume of the two VGT's is used to establish a rate of appreciation, or upward pressure, on the value of achieving GHG reductions over the given time period.

Figure 35:
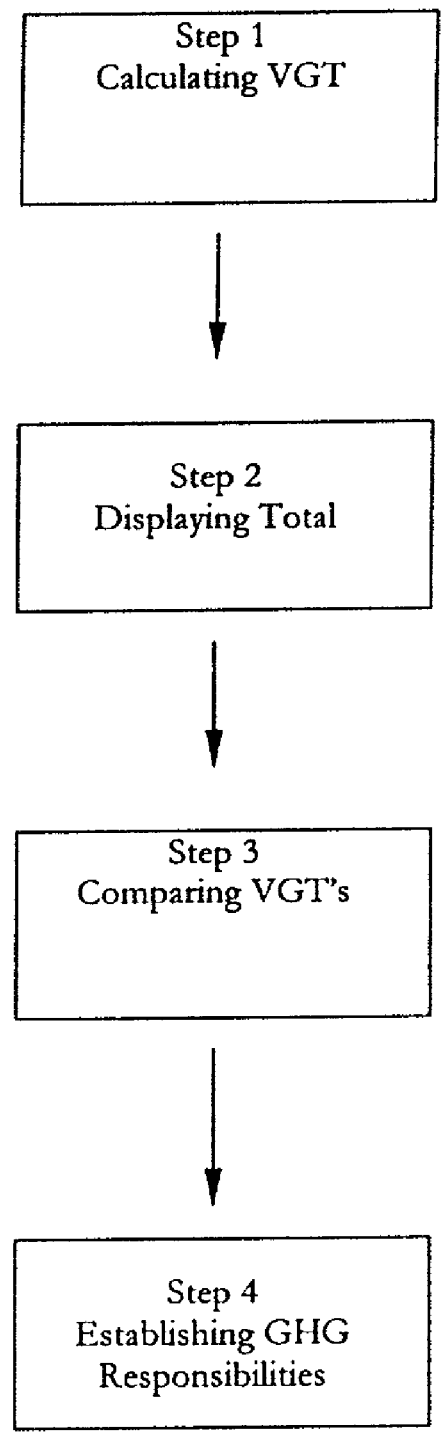
FIG. 35 describes a method for comparing among various GHG emissions data sets.

FIG. 35 describes a method for comparing among various GHG emissions data sets. The VGT helps visualize the share of one emission set relative to others. With VGT's, the contribution of an organization, a product, or activity to Global Warming as a whole can be established. Using VGT's, maps can be created to show downstream emissions from products after they have left the manufacturer and are in consumer hands. By comparing sets of VGT's of similar products in use, for example, the relative GHG life cycle impact of those products in varying locations can be established. Step 1) VGT of all years of GHG activities of a single point (owner, organization and so on) are calculated. Step 2) Total VGT appears. Step 3) The above VGT total is compared to current VGT total of another group or grouping. Step 4) The two VGT's are compared to establish relative GHG responsibilities.

Figure 36:
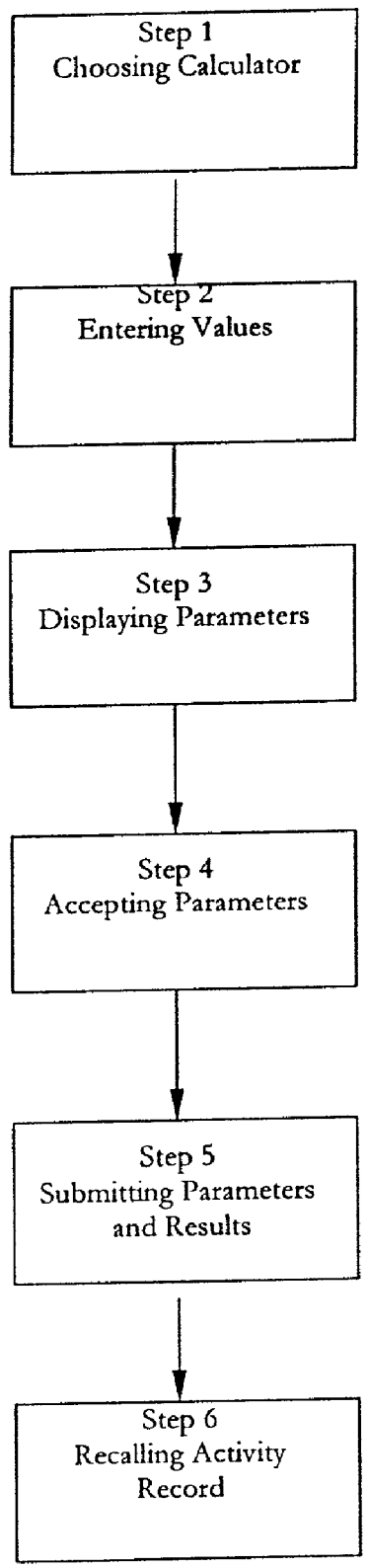
FIG. 36 describes the method used to record Provider and client generated GHG formulas.

FIG. 36 describes the method used to record Provider and client generated GHG formulas. Step 1) User chooses Activity Calculator in Account Management. Step 2) User enters values to activate emissions formula. Step 3) Emissions parameters, and GHG results are displayed to user. Step 4) User accepts the parameters and resulting GHG total, or changes the parameters till satisfied. Step 5) User submits GHG Activity, parameters and resulting GHG's to be recorded in Account Summary. Step 6) GHG Activity record can be recalled for auditing, verification, offset and informational purposes.

Figure 37:
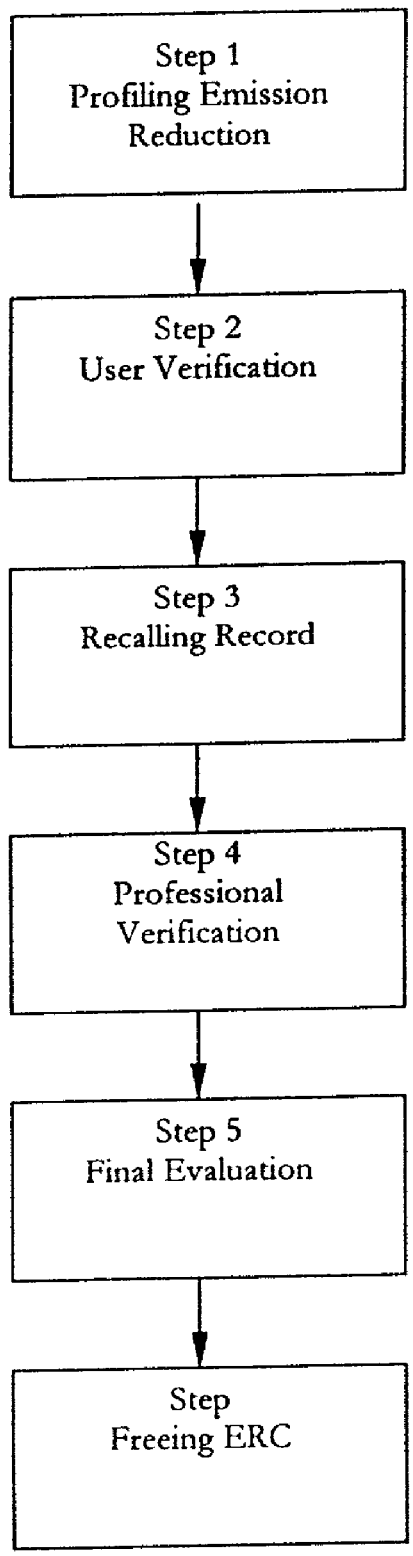
FIG. 37 describes the method for creating an ERC on-line.

FIG. 37 describes the method for creating an ERC on-line. By enabling various parties access to an emission reduction record, the efficiency of creating ERC's is lowered for all participants, and reductions can be more easily legitimized in accordance with locally established rules and regulations. This online process also lowers the cost of creating an ERC for participants involved and enables the virtual creation of an ERC. Step 1) Emission Reduction is profiled. Step 2) User initiates verification sequence, communicates and engages Auditors or other Professional. Step 3) Emission reduction record is recalled by professional. Step 4) Professional checks and signs off on record. This can be repeated by various auditors, including government authorities, depending on local circumstances. Step 5) Notice of verification completion is forwarded to Provider or authorized agent for final evaluation. Step 6) The legitimized Emission Reduction becomes an Emission Reduction Credit, and the ERC is freed up in the system to be banked, retired, traded or transferred.

The present invention generally comprises a client web interface (CWI) application for graphical user interface (GUI), maintenance (back-end) applications to support the Site, database server software and the database associated therewith, and an administrative interface, each of which will be discussed in detail below.

Figure 38:
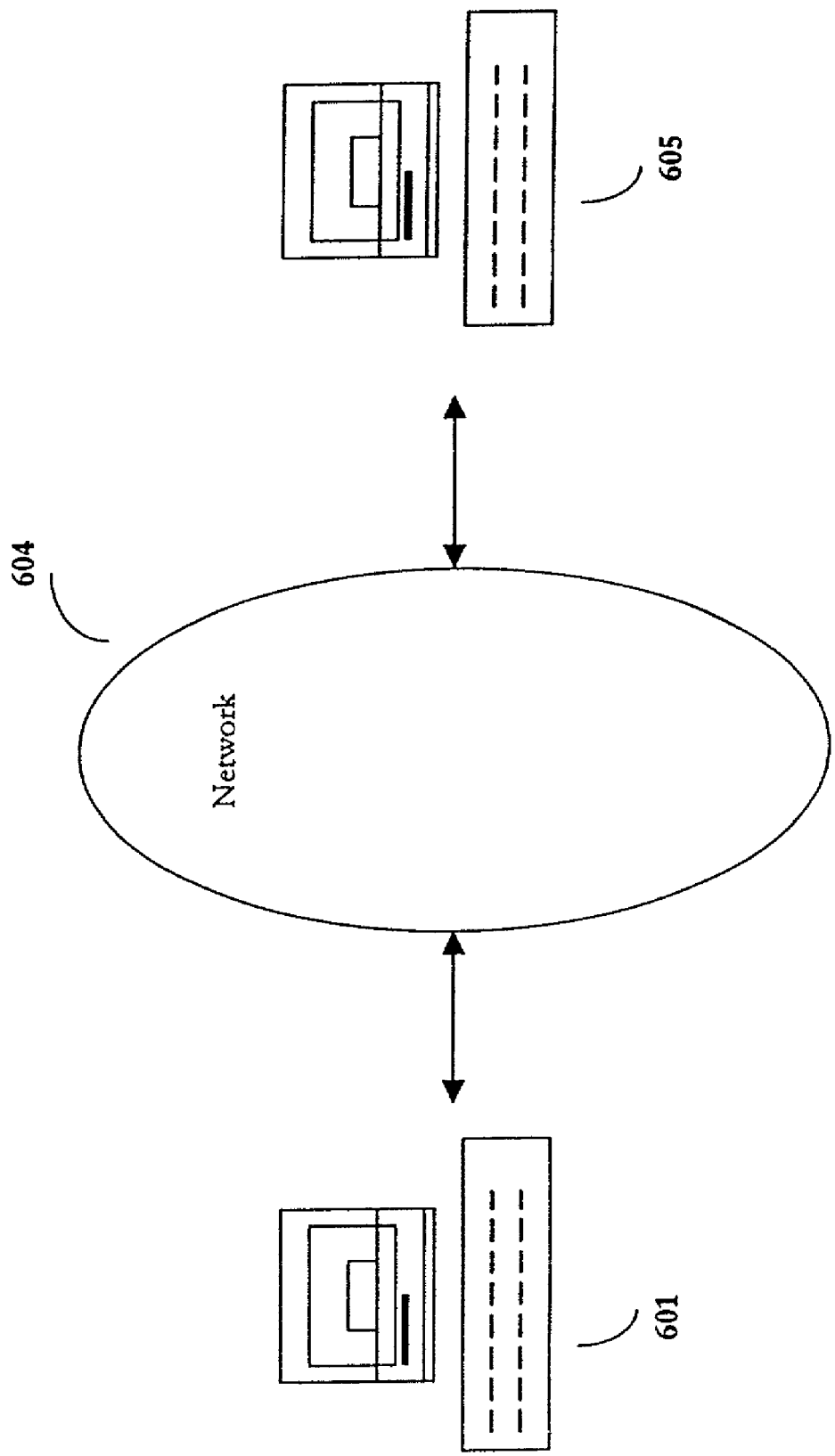
FIG. 38 shows a high level diagram of an exemplary computing system network on which the present invention may be implemented.

FIG. 38 is a high level diagram of an exemplary computing system network on which the present invention may be implemented. The system includes a web server 601 for storing web pages, and a client computer 605 capable of accessing the web pages on server 601. Server 605 may be any number of known computers, or network of computers, capable of hosting a website. Similarly, client 605 may be any number of known computers, or network of computers, capable of supporting a web browser. Server 601 and client 605 are coupled to one another via a network 604, such as the Internet. To retrieve a web page stored on server 601, the user of client 605 specifies a URL (uniform resource locator). The specified URL allows web browsing software running on client 605 to initiate communication with server 601 and access the desired HTML page, which a browser interprets and displays on client 605.

Figure 39:
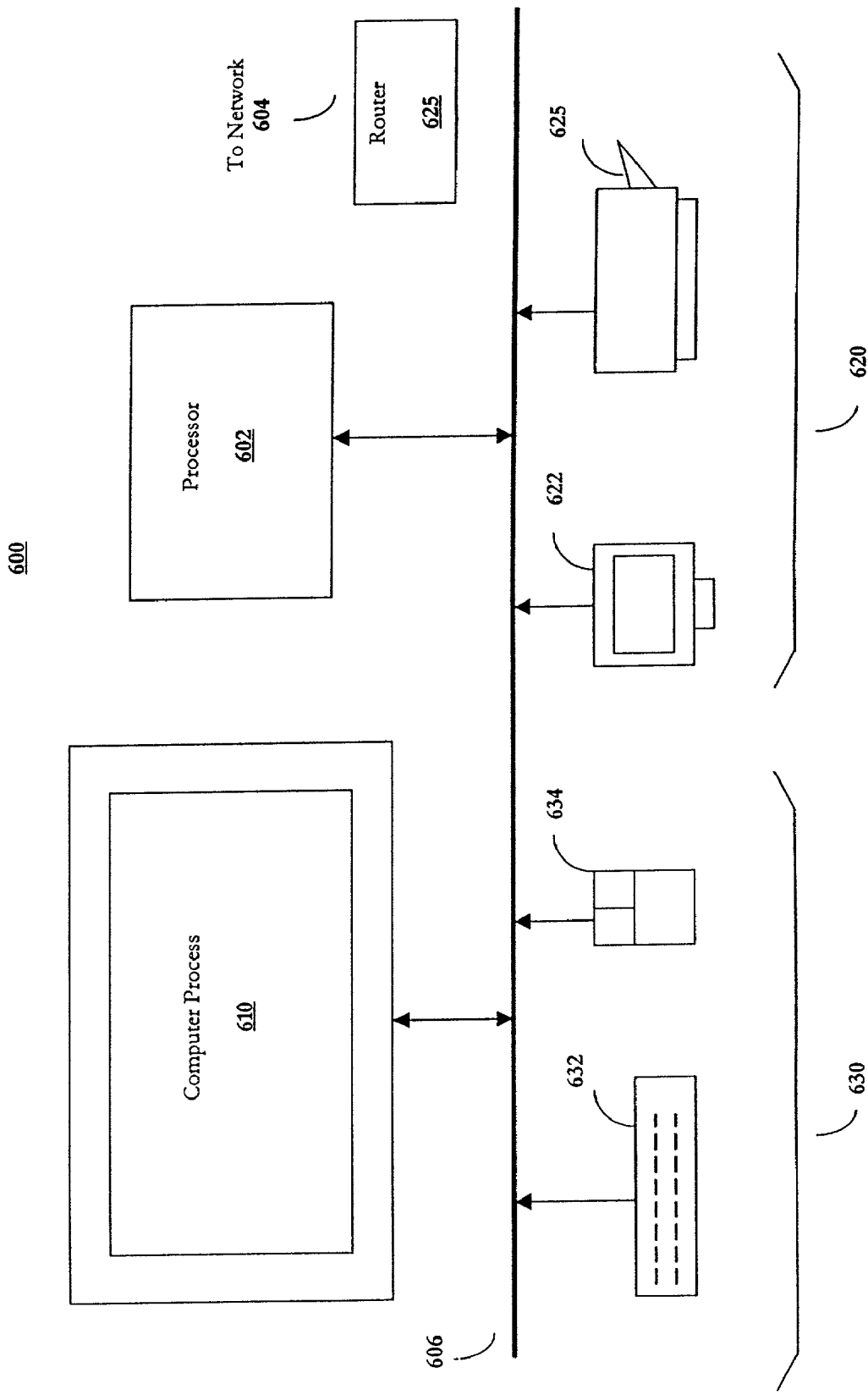
FIG. 39 shows a detailed diagram of a computer system.

FIG. 39 is a more detailed diagram of a computer system 600, which may be client 605 or server 601. The computer system 600 includes a processor 602 and a memory 604 coupled to the processor 602 through a bus 606. The processor 602 retrieves computer instructions from memory 604 and executes those instructions. The processor 602 also (1) reads data from and writes data to memory 604, (2) sends data and control signals through bus 606 to one or more computer output devices 620, (3) receives data and control signals through bus 606 from one or more computer input devices 630 in accordance with the computer instructions, and (4) transmits and receives data through bus 606 and router 625 to network 604.

Memory can include any type of computer memory including, without limitation, random access memory (RAM), read-only memory (ROM), and storage devices that include storage media such as magnetic and/or optical disks. Memory includes a computer process 610, such as a web browser or web server software. A computer process includes a collection of computer instructions and data that collectively defines a task performed by the computer system 600.

Computer output devices 620 can include any type of computer output device, such as a printer 625, a cathode ray tube(CRT) 622 (alternatively called a monitor or display), a light-emitting diode (LED) display, or a liquid crystal display (LCD). CRT display 622 preferably displays the graphical and textual information of the web browser. Each of the computer output devices 620 receives from the processor 602 control signals and data and, in response to such control signals, displays the received data.

User input devices 630 can include any type of user input device such as a keyboard 632, or keypad, or a pointing device, such as an electronic mouse 634, a trackball, a lightpen, a touch-sensitive pad, a digitizing tablet, thumb wheels, or a joystick. Each of the user input devices 630 generates signals in response to physical manipulation by a user and transmits those signals through the bus 606 to the processor 602.

As previously discussed, to view a web page on client 605, the user specifies, via a URL, the location of the desired web page. The browser on client 605 then retrieves the HTML file for the specified web page, interprets the file, and displays it as a web page.

Figure 40:
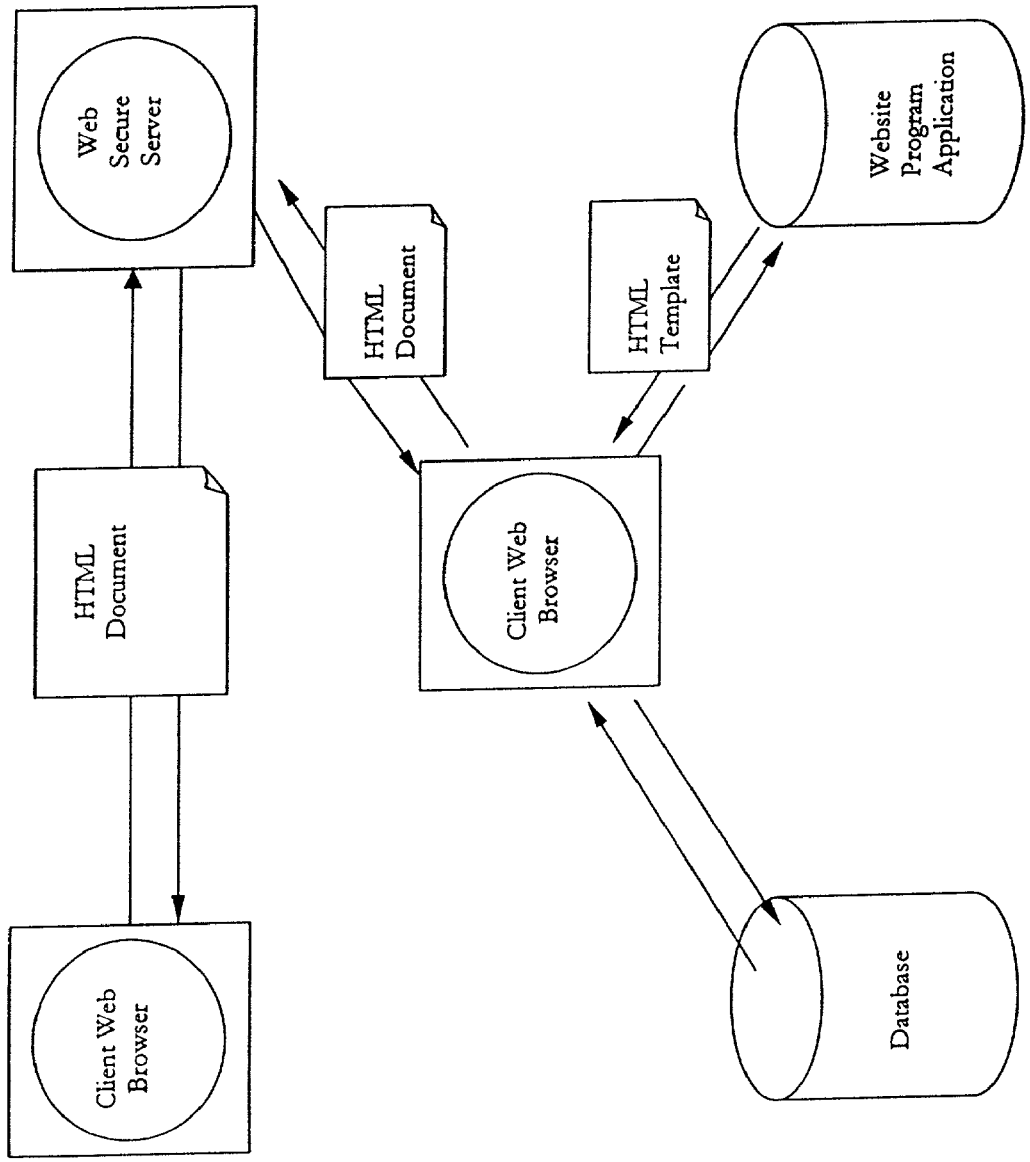
FIG. 40 shows an overview of a simplified embodiment of hardware architecture for implementation of the present invention.

FIG. 40 is an overview of a simplified embodiment of hardware architecture for implementation of the present invention as a client/server architecture for HTML documents. The architecture preferably comprises at least two networked computer processors (client component and server component(s)) and a database(s). The computer processors can be processors that are typically found in personal desktop computers (e.g., IBM, Dell, Macintosh), portable computers, mainframes, minicomputers, Unix systems, or other computing devices. Preferably in the networked client/server architecture of the present invention, a classic two or three tier client/server model is utilized. Preferably, a relational database management system (RDMS), either as part of the Application Server component or as a separate component (RDB machine), provides the interface to the database.

In a preferred database-centric client/server architecture, the client application generally requests data and data-related services from the application server which makes requests to the database (or the database server). The server(s) (e.g., either as part of the application server machine or a separate RDB/relational database machine) responds to the client's requests and provides access to data. Basic interaction between a client and server is known in the art. In a preferred embodiment of the present invention, a user at a client computer submits a request to the server for a specified action (e.g., modify preferences for custom page). The server receives the request and passes it on to a software program, preferably a CGI (Common Gateway Interface) program that resides in the server computer and processes data submitted from a client. The CGI program processes the data related to the request and dynamically generates a new HTML document and returns it to the server. The server sends the new HTML document to the client. The client then displays the HTML document for the user by using a browser program such as Netscape Navigator. Other requests may be processed or the process may terminate.

More specifically, the client components are preferably complete, stand-alone, personal computers offering a fall range of power and features to run applications. The client component preferably operates under any operating system and includes communication means, input means, storage means, and display means. The user enters input commands into the computer processor through input means which could comprise a keyboard, mouse, or both. Alternatively, the input means could comprise any device used to transfer information or commands. The display comprises a computer monitor, television, LCD, LED, or any other means to convey information to the user. In a preferred embodiment, the user interface is a graphical user interface (GUI) written for web browser applications.

The server component(s) can be a personal computer, a minicomputer, or a mainframe and offer data management (information sharing between clients), network administration, and security. The Database Server (RDBMS—Relational Database Management System) and the Application Server may be the same machine or different hosts if desired.

The present invention also envisions other computing arrangements for the client and server(s), including processing on a single machine such as a mainframe, a collection of machines, or other suitable means. The client and server machines work together to accomplish the processing of the present invention.

The database is preferably connected to the database server component and can be any device which will hold data. For example, the database can consist of any type of magnetic or optical storing device for a computer (e.g., CDROM, internal hard drive, tape drive). The database can be located remote to the server component (with access via modem or leased line) or locally to the server component.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

Following are examples which illustrate procedures for using and interacting with the invention as a web site, in the form of linked pages. These examples should not be construed as limiting.

EXAMPLE 1

Bank: New User Registration/Existing User Account Management

1. Open site: View home page and navigation tool
2. Click Account Management: View Acct Mgmt. screen which has links to Open Acct, Login, & Acct mgmt.
3. New User:
a) Open Acct. screen: User fills out all information necessary to open an account.
b) Acct. mgmt. screen: See below
3. Existing User:
a) Login screen: This is where an existing user identifies themselves to the site.
b) Acct. mgmt.: From here there is access to the following screens:
4. Update Acct. info: User may record a change of address, phone number, etc.
5. RE professional and manufacturer info pgs: Displays information and advertisements submitted by RE professionals and manufacturers on their registration forms.
6. Acct. summary: This page displays acct. activity. Tons offset, systems registered, monetary value of assets and transactions.
7. Carbon Source Registration:
a) Vehicle: Here acct. holders can select their vehicle from our database and view its mpg. After selecting their vehicle, they are asked to provide an estimate of their city and highway miles. Upon submission, these are compared with published data to return the amount of $CO_2$ produced by that car for the hwy/city mile combination specified by the acct. holder.
b) Home: In this module, acct. holders can assess the emissions impact of their home. They are asked to fill in the amounts of kWhs, therms of natural gas, and gals of propane, diesel or gas that they have used during a given time period. The amount of emissions produced by this consumption is displayed, and they are given the option to offset their emissions by purchasing emission reduction credits (ERC's) equal to their consumption.
c) Air Travel: Information needed to assess the emissions produced by a flight from point A to point B is asked here. Upon display of the amount of emissions, acct. holder is asked if they wish to offset the flight with the purchase of ERC's.
d) Other Activities: Other activities that can be offset include: ATV's, boats, shoes production, services, etc. These are calculated by using the amount of fuel burned, multiplying by the % of carbon content, then converted to $CO_2$ by standard methods.
8. Carbon Sink Registration: This pg is for registration of forest lands that are being managed over many decades and will act as $CO_2$ "sinks", pulling $CO_2$ out of the atmosphere releasing the $O_2$ and keeping the carbon. Provider reviews the form, verifies the existence of the forest and the tree types, and calculates the amount of $CO_2$ removed from the atmosphere. This, in turn, is used to calculate the ERC's that can be credited to this acct.

EXAMPLE 2

Renewable Energy:

Users can: Users can:
1. Register their RE system (ST, PV WT, MH, CS):
a) If no user acct., go to Open Acct. screen
b) Users can fill out registration forms for solar thermal, photovoltaic, wind turbine, microhydro, or carbon sequestration (forests) systems to apply for ERC's. These credits are then put into their user acct. in the bank.
2. Register as a RE Professional:
a) If no user acct., go to Open Acct. screen
b) User can fill out registration form for submission. Provider will review form, verify existence, and communicate with registrant regarding photos, ads, etc.
3. Register as a RE Manufacturer:
a) If no user acct., go to Open Acct. screen
b) User can fill out registration form for submission. Provider will review form, verify existence, and communicate with registrant regarding photos, ads, etc.
4. Apply for financing for a RE system:
a) If no user acct., go to Open Acct. screen
b) User can fill out application form for submission. Provider will review form and communicate with applicant regarding financing particulars.
5. Search Registered RE systems: This pg is to answer certain questions about the number of what particular types of RE systems are registered in the database. Used for information purposes.

EXAMPLE 3

Products and Services:

Users can:
1. Certification: Link to Certification to learn about the carbon cycle via flash commercial; offset vehicles, homes, air travel, or other activities. This process is similar to the one presented in the bank description above.
2. Related Services: This page provides a listing of professional services peripheral to the RE industry. For instance, companies offering legal or consultation services would be found here.
3. Database: Here people can view various calculations regarding $CO_2$ such as how much is being produced in a particular country and how large a volume the emissions occupy. For instance, in the US, our emissions would cover a surface equal to the land area to a depth of approximately one foot. Constants, conversion calculators (e.g. yard to meter), and interesting carbon facts appear here for informational purposes.
4. Kids Page: Facts regarding $CO_2$ are presented at a child's level of explanation.
5. Resources: Lists web sites and other source material either used in the site, or listed for additional information.

The following tables are used in a preferred embodiment of the invention:

Table 1: Stores advertisements for RE professionals and manufacturers, allows targeting to specific user levels and limited administration by user.

TABLE 2

Carbon Bank, stores amount of carbon in transaction, the source device, the sink, and the various people/organizations involved.

```
CREATE TABLE [dbo].[bank] (
    [SERIAL] [int] IDENTITY (1, 1) NOT NULL,
    [original_mass] [int] NOT NULL,
    [net_mass] [int] NOT NULL,
    [compound_id] [int] NOT NULL,
    [producer_id] [int] NULL,
    [prod_owner_id] [int] NULL,
    [prod_affiliate_id] [int] NULL,
    [prod_manufacturer_id] [int] NULL,
    [prod_unit_price] [money] NULL,
    [sink_id] [int] NULL,
    [sink_owner_id] [int] NULL,
    [sink_affiliate_id] [int] NULL,
    [sink_manufacturer_id] [int] NULL,
    [sink_unit_price] [money] NULL,
    [bank_owned] [bit] NOT NULL,
    [special] [bit] NOT NULL,
    [pending] [bit] NOT NULL,
    [date_entered] [datetime] NULL,
    [date_modified] [datetime] NULL,
    [test] [bit] NOT NULL,
    [sink_comment_id] [int] NULL
```

Table 3: Records a building in the database as a location of reduction or emission activities.
Table 4: Recorded results of auditing for a GHG activity, used for statistical information as opposed to trading.
Table 5: Distinct cities recorded by state and country, used in search and registration.
Table 6: General notations on a record, referenced by various tables.
Table 7: Stores all the information about the GreenHouse Gases (GHGs) and other emissions the system tracks, and current price for bank-owned bulk credits.
Table 8: Connects country names with ISO codes, used in search and registration.
Table 9: GHG Information Administrators in respective countries. (Temporary, will reference contacts table)
Table 10: Controls percentage breakdown of ERCs among various participants/roles, edited by ICBE administrators.
Table 11: Details of applications for carbon sequestration (sink) accreditation/auditing/ERC generation.
Table 12: Power Control Area (utility & location) emission rates (g/kWh).
Table 13: Deprecated table, now used for import processing of PCA rates.
Table 14: Annual emissions per tracked compound by country. May be divided into states upon further data collection.
Table 15: Deprecated table, now used for import of annual national emissions.
Table 16: Available drop-downs or selection categories in an emission/reduction formula (headings).
Table 17: User-entered values of variables in an emission/reduction formula.
Table 18: Variables in an emission/reduction formula for which the person performing an audit supplies a value directly.
Table 19: Reference to the selected item in a drop-down or category in an emission/reduction formula, associated with a specific calculation record.
Table 20: The variables and their values in an emission/reduction formula resulting from a selected item in a drop-down or category.
Table 21: The available items in a drop-down or category in an emission/reduction formula.
Table 22: Calculations involved in emissions or reductions by an activity for which no module has been developed. This allows for auditing of one-time events such as air travel, where only the activity and not the origin of the emissions (e.g. the plane) should become a permanent part of the account holder's record, without any credit exchange taking place. It also allows for user-created formulas for specific activities in any supported programming language (with on-the-fly variable substitution) as well as faster response time from Provider while full-scale modules are still in development.
Table 23: The position of any device, organization, person, or activity requiring global position information. Note: degrees & minutes deprecated, stored as floating-point in seconds only.
Table 24: Extremely generalized aliases on nearly any item in the database (e.g. vehicle license plate number, VIN). May expand to include identifier type.
Table 25: Location of any object in the database, with optional global position.
Table 26: Items (RE system components, carbon sources, et al) produced under a given make, or manufacturer alias.
Table 27: Make (manufacturer alias) of any RE system component, carbon source, or other manufactured item.
Table 28: Items (RE system components, carbon sources, et al) produced by a given manufacturer.
Table 27: Identifies organizations in the database (RE Manufacturers, Professionals, Carbon Source Manufacturers, Businesses offsetting or auditing emissions, Government entities, et al).
Table 29: Potential types or classes of manufactured items.
Table 30: Details of applications for micro hydro (system) accreditation/auditing/ERC generation.

Table 31: General micro hydro system profiles to be used as templates during the registration process.
Table 32: Models of manufactured items.
Table 33: Values reported by system monitors, power meters, and like recording devices for use in carbon auditing.
Table 34: System monitors, power meters, and like recording devices for use in carbon auditing, with annotations.
Table 35: People related to a given organization and their access level or type of association to that organization's profile.
Table 36: Organizations in the database (RE Manufacturers, Professionals, Carbon Source Manufacturers, Businesses offsetting or auditing emissions, et al).
Table 37: Bank users, considered owners of carbon sources, sinks, and credits.
Table 38: Historical annual national population (census) data.

TABLE 39

Uniquely identified Carbon sources, referenced by bank activities

```
CREATE TABLE [dbo].[producers] (
[SERIAL] [int] IDENTITY (1, 1) NOT NULL,
[name] [varchar] (32) COLLATE SQL_Latin1_General_CP1_CI_AS NULL,
[producer_type] [tinyint] NULL,
[producer_id] [int] NULL,
[contact_id] [int] NULL,
[comment_id] [int] NULL,
[date_entered] [datetime] NULL,
[date_modified] [datetime] NULL,
[test] [bit] NULL,
[beta] [bit] NULL
```

Table 40: Stores the existence of checkboxes for profiles for various sinks, producers, owners, organizations, et al.
Table 41: Stores any selected profile items selected for a given sink, producer, owner, organization, et al.
Table 42: Details of applications for photovoltaic (system) accreditation/auditing/ERC generation.
Table 43: Applications for financing of a new photovoltaic system.
Table 44: General photovoltaic system profiles to be used as templates during the registration process.
Table 45: Collections of countries in a given region (annex, continent, etc.).
Table 46: Arbitrary collections of countries, termed a region for the typical case.
Table 47: Calculated sink reduction information pending bank entry, for sinks with flat production values. Others use some variant of calculations table.

TABLE 48

Generic carbon reduction activity or device to be associated with owners or organizations, for accreditation/auditing/ERC generation.

```
CREATE TABLE [dbo].[sinks] (
    [SERIAL] [int] IDENTITY (1, 1) NOT NULL,
    [sink_type] [int] NULL,
    [sink_id] [int] NULL,
    [contact_id] [int] NULL,
    [owner_id] [int] NULL,
    [professional_id] [int] NULL,
    [accreditation_level] [tinyint] NULL,
    [comment_id] [int] NULL,
    [pro_comment_id] [int] NULL
    [percentage_to_fund] [float] NULL,
    [date_entered] [datetime] NULL,
    [date_modified] [datetime] NULL,
```

TABLE 48-continued

Generic carbon reduction activity or device to be associated with owners or organizations, for accreditation/auditing/ERC generation.

```
[test] [bit] NULL,
[beta] [bit] NULL,
```

Table 49: Solar module profiles, generally for use in solar RE systems. Note: may diverge into system-specific module types upon further data collection.
Table 50: Specific solar modules placed in an RE system or other location.
Table 51: Details of applications for solar thermal (system) accreditation/auditing/ERC generation.
Table 52: Applications for finance of a new solar thermal system.
Table 53: General solar thermal system profiles to be used as templates during the registration process.
Table 54: States in a given state_list.
Table 55: Arbitrary collections of states or other national administrative divisions.
Table 56: States or other national administrative divisions, indexed by country for use in search and registration.
Table 57: Deprecated table, now used for import of states by country.
Table 58: Renewable energy system registrations for accreditation/auditing/ERC generation.
Table 59: Mechanical/electronic solar tracking devices to move panels/modules in solar RE systems.
Table 60: Financial transactions involving ICBE for fee tracking and accounting.
Table 61: Tree or other plant mass types for use in carbon sequestration sinks.
Table 62: Trees or other plant mass associated with specific carbon sequestration sinks,
Table 63: Specifications of turbine blade models.
Table 64: Specifications of turbine models.
Table 65: Turbines installed in an RE system.
Table 66: Utility (electric/gas) companies with contact information.
Table 67: An individual or organization's energy use profile, usually associated with a building or renewable energy system.
Table 68: Significant variations on models of manufactured items (e.g. cars, aircraft).
Table 69: Vehicle types, generally automobiles with a known fuel consumption.
Table 70: Water tank profiles, generally tied to residential or commercial water heaters (including solar thermal RE systems).
Table 71: Water tanks in a specific RE system or location.
Table 72: Details of applications for wind turbine (system) accreditation/auditing/ERC generation.
Table 73: General wind turbine system profiles to be used as templates during the registration process.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for registration of carbon sinks comprising renewable energy and emission reduction systems, wherein a carbon sink represents an asset in an account, the method comprising:
   (a) receiving information to identify a carbon sink customer account;
   (b) receiving input to identify type of carbon sink;
   (c) receiving input data used to calculate emission reduction provided by the carbon sink;
   (d) calculating an emission reduction credit (ERC) value representative of the renewable energy and emission reduction provided by the carbon sink;
   (e) receiving a selection of type of accreditation level from a plurality of accreditation levels which determine a percentage of the ERC value that will be credited to the carbon sink customer account with the remaining percentage of ERC value being divided among a plurality of funds outside the carbon sink customer account;
   (f) crediting the percentage of the ERC value to the carbon sink customer account based on the selected type of accreditation level.

2. The method of claim 1, wherein the step (b) of receiving input to identify type of carbon sink comprises selecting type of carbon sink from one of the following:
   (i) solar thermal;
   (ii) photovoltaic;
   (iii) micro-hydro;
   (iv) wind turbine; and
   (v) carbon sequestration.

3. The method of claim 1 further comprising the step of receiving data representative of the location of the carbon sink and indexing the information using a Global Positioning System (GPS).

4. The method of claim 1 wherein the remaining percentage of ERC value not credited to the carbon sink customer account is divided according to accreditation level and credited to a plurality of funds comprising an insurance fund to insure the registered carbon sink in accordance with certain events which may affect its emission reductions, a yearly administrative fund to apply to the costs of operating the registration system, a certifier's fund to apply to the costs of certifying the sink, and a discount fund which acts as an uncertainty factor for ERC calculations.

5. The method of claim 1, wherein the step (c) of receiving input data used to calculate emission reduction provided by the carbon sink comprises receiving specific parameters for the type of sink selected.

6. The method of claim 1 further comprising the step of constructing a virtual box representing the yearly emissions reductions of the carbon sink to ensure that ERCs in a given time period and given place are assigned only once, the box assigned to geographical coordinates of the sink, wherein the box expresses the amount of GHGs reduced by gram and in cubic centimeters of the carbon sink.

7. The method of claim 1 further comprising the step of assigning identification tags to the ERC values, the tags comprising one or more of location of sink, owner of sink, certifier of sink, and digital record of sink.

8. The method of claim 1 further comprising the step of donating a percentage of the ERC value credited to the carbon sink customer account to a separate entity.

9. The method of claim 1 further comprising the step of exchanging ERC values in the carbon sink customer account for monetary assets.

10. The method of claim 9, wherein the step of exchanging comprises:
   (a) storing ERC values tagged with an identification unique to the carbon sink in a pool pending sale; and
   (b) transmitting monetary assets to the carbon sink customer account upon purchase of ERC value from pool.

11. The method of claim 1 further comprising a method for registration of a carbon source, wherein greenhouse gas (GHG) emissions of the carbon source represents a liability, comprising:
   (a) receiving information to identify a carbon source customer account;
   (b) receiving input to identify type of carbon source;
   (c) receiving input data used to calculate energy consumption and greenhouse gas (GHG) emissions output of the carbon source;
   (d) calculating a greenhouse gas (GHG) emissions value produced by the carbon source; and
   (e) debiting the GHG value from the carbon source customer account.

12. The method of claim 11, wherein the step (b) of receiving input to identify type of carbon source comprises selecting type of carbon source from one of the following:
   (i) vehicles;
   (ii) structures;
   (iii) travel;
   (iv) manufacture of products; and
   (v) providing services.

13. The method of claim 11, wherein the step (c) of receiving input data used to calculate energy consumption and greenhouse gas (GHG) emissions output of the carbon source comprises receiving specific parameters for the type of source selected.

14. The method of claim 11, further comprising the step of assigning a monetary liability to the GHG value.

15. The method of claim 14, further comprising the steps of
   (i) accepting payment from a carbon source customer;
   (ii) using the payment to purchase ERC values associated with a carbon sink, said ERC values representing an asset in an account;
   (iii) crediting the ERC values as assets against the monetary liability assigned to the GHG value, whereby the GHG value in the carbon source customer account is reduced accordingly.

16. The method of claim 15, further comprising the steps of tagging the ERC values purchased with the identification of the carbon sink associated therewith and associating the carbon sink identification with the carbon source of the carbon source customer.

17. A method for tracking emission reduction credits between carbon sink customers as sellers and carbon source customers as purchasers, wherein the emission reduction credits assigned to a carbon sink represent an asset in an account, comprising:
   (a) registering for a seller a carbon sink in accordance with the steps of claim 1;
   (b) assigning a unique identification to the emission reduction credit (ERC) value of the seller;
   (c) making the ERC value for the carbon sink available for purchase;
   (d) receiving a purchase request from a purchaser for the ERC value;
   (e) matching the unique identification to an identification of the purchaser;
   (f) crediting the ERC value to a purchaser account as an asset.

18. The method of claim 17, wherein if the purchaser account includes greenhouse gas (GHG) emissions values produced by a carbon source of the purchaser, wherein the greenhouse gas (GHG) emissions value represents a liability, the method further comprising the steps of
(i) balancing the liabilities of the GHG values in the purchaser account with the assets of the ERC value purchased; and
(ii) associating the unique identification of the ERC value from the carbon sink to a unique identification of the carbon source of the purchaser.

19. The method of claim 17 wherein step (c) of making the ERC value for the carbon sink available for purchase comprises pooling the ERC value in a pool with other ERC values from a plurality of sellers having ERC values associated with their carbon sinks.

20. The method of claim 19, prior to step (d) of receiving a purchase request from a purchaser for the ERC value, further comprising the steps of
(i) searching the pool for an ERC value associated with a specific carbon sink substantially matching the search criteria; and
(ii) displaying the results of the search.

21. The method of claim 17 further comprising the step of receiving a fee from the purchaser in the form of a percentage of the ERC value prior to crediting the ERC value to an account of the purchaser.

22. The method of claim 1 further comprising receiving information regarding boundaries, ownership, land use management, and community impact for biological and geological carbon sinks.

23. The method of claim 12 wherein, if vehicle is selected as type of carbon source, further comprising the steps of:
(i) receiving input data for at least one of make, model, variants, year, VIN#, time period, annual mileage;
(ii) calculating GHG value for the vehicle in accordance with input data received.

24. The method of claim 12 wherein, if structure is selected as type of carbon source, further comprising the steps of:
(i) receiving input data for at least one of power consumption, propane consumption, gasoline consumption;
(ii) calculating GHG value for the structure in accordance with input data received.

25. The method of claim 24, wherein if structure is a company, further comprising the step of addition to the GHG value emissions produced by vehicles owned by the company.

26. The method of claim 12 wherein, if travel is selected as type of carbon source, further comprising the steps of:
(i) receiving input data for at least one of arrival and departure points, method of travel, type of transportation, travel dates;
(ii) calculating GHG value for the travel in accordance with input data received.

27. The method of claim 12 wherein, if manufacture of products is selected as type of carbon source, further comprising the steps of:
(i) receiving input data representative of emissions produced during the manufacture and distribution of a product;
(ii) calculating GHG value for the manufacture of the product in accordance with input data received.

28. The method of claim 27 further comprising the steps of:
(iii) purchasing an amount of ERC value sufficient to offset the GHG value from a seller who has registered a carbon sink comprising renewable energy and emission reduction systems, wherein an emission reduction credit (ERC) value is representative of the renewable energy and emission reduction provided by the carbon sink;
(iv) certifying the product as GHG neutral as a result of the offset.

29. The method of claim 28 wherein the product is gasoline.

30. The method of claim 12 wherein, if providing services is selected as type of carbon source, further comprising the steps of:
(i) receiving input data representative of emissions produced during the provision of a service;
(ii) calculating GHG value for the provision of the service in accordance with input data received.

31. The method of claim 30 further comprising the steps of:
(iii) purchasing an amount of ERC value sufficient to offset the GHG value from a seller who has registered a carbon sink comprising renewable energy and emission reduction systems, wherein an emission reduction credit (ERC) value is representative of the renewable energy and emission reduction provided by the carbon sink;
(iv) certifying the service as GHG neutral as a result of the offset.

32. A computer system for registration of carbon sinks comprising renewable energy and emission reduction systems, wherein a carbon sink represents an asset in an account, the system comprising:
input device for receiving information to identify a customer account; receiving input to identify type of carbon sink; receiving input data used to calculate emission reduction provided by the carbon sink; and receiving a selection of type of accreditation level from a plurality of accreditation levels which determine a percentage of the ERC value that will be credited to the customer account with the remaining percentage of ERC value being divided among a plurality of funds outside the customer account;
processor for calculating an emission reduction credit (ERC) value representative of the renewable energy and emission reduction provided by the carbon sink; and crediting the percentage of the ERC value to the customer account associated with the carbon sink based on accreditation level; and
display for displaying customer accounts.

33. The computer system of claim 32 further comprising a system for registration of a carbon source, wherein a carbon source represents a liability in an account, wherein said input device further receives input to identify type of carbon source; and receives input data used to calculate energy consumption and emissions output of the carbon source; and wherein said processor calculates a greenhouse gas (GHG) emissions value produced by the carbon source; and debits the GHG value from a specific customer account associated with the carbon source.

34. A system for tracking emission reduction credits between sellers and purchasers, wherein the emission reduction credits assigned to a carbon sink represent an asset in an account, comprising a computer processor programmed to:
(a) register for a seller a carbon sink in accordance with the steps of claim 1;
(b) assign a unique identification to the emission reduction credit (ERC) value of the seller;
(c) make the ERC value for the carbon sink available for purchase;
(d) receive a purchase request from a purchaser for the ERC value;
(e) match the unique identification to an identification of the purchaser; and
(f) credit the ERC value to an account of the purchaser as an asset.

35. A computer readable storage media containing program instructions for displaying data on a display device of a computer system, the data being obtained from tables in a database associated with the computer system, the computer readable media comprising computer program code for implementing the steps of claim 1.

36. A computer readable storage media containing program instructions for displaying data on a display device of a computer system, the data being obtained from tables in a database associated with the computer system, the computer readable media comprising computer program code for implementing the steps of claim 11.

37. A computer readable storage media containing program instructions for displaying data on a display device of a computer system, the data being obtained from tables in a database associated with the computer system, the computer readable media comprising computer program code for implementing the steps of claim 17.

38. A computerized storage and retrieval system for exchanging emission reduction credits (ERC) values associated with a carbon sink registered in accordance with the steps of claim 1, (ERC) values representing an asset in an account, for GHG values associated with a carbon source, representing a liability in an account, comprising a data storage means for storing data in a relational database wherein the database comprises tables, each table having a domain of at least one attribute in common with at least one other table, the tables comprising:
 at least one table for storing all ERC values available for purchase.

39. The system of claim 38 further comprising at least one of the following tables:
 at least one table for storing amount of carbon in a transaction, the source device, the sink, and the entities involved;
 at least one table for recording results of auditing for a GHG activity used for statistical information;
 at least one table for storing all information about the GreenHouse Gases (GHG) and other emissions the system tracks and the current price for bank owned credits;
 at least one table for storing percentage breakdown of ERCs among various participants; and
 at least one table for storing details of application for carbon sequestration/ sink accreditation, auditing and ERC generation.

40. A method for mapping GHG emissions information using various parameters to aid in the management of the transfer of GHG reductions to offset emissions by creating a volumetric global positioning system timestamp (VGT) comprising:
 recording GHG activity including data indicative of location, address, GPS, elevation, GHG parameters and time frame of event;
 creating a Volumetric GPS Timestamp (VGT) as a virtual box representing the emission or reduction volume of a GHG;
 associating the VGT box with a discreetly defined space on planet earth, using the GPS and elevation coordinates anchoring the bottom center of the VGT box, wherein the VGT box serves as a marker, aiding discovery of emission and reduction information introduced that has the same time frame, location, or volume; and
 projecting and transposing 'empty' boxes on top of full boxes to manage the transfer of GHG reductions to offset emissions.

41. The method of claim 40, further comprising:
 comparing emissions impact using temperature as a factor comprising:
 (a) charting the volume of one ton CO2 as it becomes lager over time as a result of increasing temperature, which expands the volume of any given gas;
 (b) using the mean temperature as the baseline by averaging the land, air and sea surface temperatures of planet earth for a period of years;
 (c) calculating the increase in temperature from that baseline which expands the CO2 VGT box, and
 (d) calculating the relative increase in size used to compare the value of current action versus future action while keeping pressure constant at 760 torr in the equation $V \propto T$.

42. The method of claim 40 further comprising calculating the proportion clean and dirty air generated as a result of a GHG activity by
 (a) establishing VGT by combining location, elevation, time fame, GHG parameters and time frame of GHG activity;
 (b) using resulting VGT as the base to calculate the VGT of Oxygen and other molecules consumed or freed up by GHG activity;
 (c) expressing the amount of "clean air " lost or gained from the GHG activity.

* * * * *